(12) United States Patent
Ranta et al.

(10) Patent No.: US 12,502,602 B2
(45) Date of Patent: Dec. 23, 2025

(54) SYSTEMS AND METHODS FOR ARBITRARY HAPTIC WAVEFORM GENERATION

(71) Applicant: Microsoft Technology Licensing, LLC, Redmond, WA (US)

(72) Inventors: Steven William Ranta, Seattle, WA (US); Ian Hartman Skop, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 18/084,027

(22) Filed: Dec. 19, 2022

(65) Prior Publication Data

US 2024/0198216 A1 Jun. 20, 2024

(51) Int. Cl.
*A63F 13/285* (2014.01)
*A63F 13/42* (2014.01)

(52) U.S. Cl.
CPC ............ *A63F 13/285* (2014.09); *A63F 13/42* (2014.09)

(58) Field of Classification Search
CPC .................................................. A63F 13/285
See application file for complete search history.

(56) References Cited

U.S. PATENT DOCUMENTS

| | | | |
|---|---|---|---|
| 10,109,161 B2 * | 10/2018 | Shah | G06F 3/016 |
| 11,797,095 B2 * | 10/2023 | D'Souza | H02P 25/032 |
| 2007/0236449 A1 * | 10/2007 | Lacroix | G06F 3/016 |
| | | | 345/156 |
| 2015/0130706 A1 * | 5/2015 | Lacroix | A63F 13/23 |
| | | | 345/156 |
| 2019/0295755 A1 | 9/2019 | Konradi | |
| 2020/0086215 A1 * | 3/2020 | Nakagawa | A63F 13/285 |
| 2022/0253141 A1 * | 8/2022 | Enokihara | A63F 13/285 |

OTHER PUBLICATIONS

International Search Report and Written Opinion received for PCT Application No. PCT/US23/081058, Mar. 14, 2024, 15 pages.
Silva, et al., "Subjective Evaluation of Haptic Feedback Technologies for Interactive Multimedia", IEEE Eurocon 2019—18th Conference on Smart Technologies, Jul. 1, 2019, pp. 1-6.
International Preliminary Report on Patentability (Chapter I) received for PCT Application No. PCT/US2023/081058, mailed on Jul. 3, 2025, 9 Pages.

* cited by examiner

*Primary Examiner* — Jay Trent Liddle
(74) *Attorney, Agent, or Firm* — Rainier Patents, P.S.

(57) ABSTRACT

A method of providing haptic feedback to a user includes, at an electronic device controller, determining a dynamic resonant frequency of a haptic device; receiving haptic information at an electronic device controller, mapping the haptic information to a resonant waveform with the dynamic resonant frequency; outputting a haptic waveform; and driving the haptic device according to the haptic waveform.

20 Claims, 12 Drawing Sheets

SYSTEMS AND METHODS FOR ARBITRARY HAPTIC WAVEFORM GENERATION

BACKGROUND

Background and Relevant Art

Electronic device controllers allow users to provide directional and button inputs to a video game console or other computing device. Joysticks, thumbsticks, and other directional input sticks can allow for analog or digital directional inputs with the electronic device controller. Face buttons, directional input pads, and triggers can allow for digital or analog user inputs. The electronic device controller can also provide haptic feedback to the user during or independently of user inputs to the electronic device controller. As the controller often replicates holding an in-software mechanism or object, haptic feedback can increase the immersion perceived by the user.

BRIEF SUMMARY

In some embodiments, a method of providing haptic feedback to a user includes, at an electronic device controller, determining a dynamic resonant frequency of a haptic device; receiving haptic information at an electronic device controller; mapping the haptic information to a resonant waveform with the dynamic resonant frequency; outputting a haptic waveform; and driving the haptic device according to the haptic waveform.

In some embodiments, an electronic device controller includes a body, at least one input button, a processor, a communication device in communication with the processor, a haptics controller in communication with the processor, a linear haptic device in communication with the haptics controller, and a hardware storage device in communication with the processor or the haptics controller. The hardware storage device has instructions stored thereon that, when executed by the processor or haptics controller, cause the electronic device controller to determine a dynamic resonant frequency of the linear haptic device, receive haptic information, map the haptic information to the dynamic resonant frequency, output a haptic waveform, and drive the haptic device according to the haptic waveform.

In some embodiments, a method of providing haptic feedback to a user includes, at an electronic device, obtaining haptic information; receiving a dynamic resonant frequency of a haptic device of an electronic device controller; mapping the haptic information to the dynamic resonant frequency; outputting a haptic waveform; and instructing the electronic device controller to drive the haptic device according to the haptic waveform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a side perspective view of the electronic device controller of FIG. 1-1;

FIG. 2-1 is a front view of an electronic device controller with haptic regions, according to at least some embodiments of the present disclosure;

FIG. 2-2 is a side view of the electronic device controller of FIG. 2-1;

FIG. 3-1 through FIG. 3-4 illustrates the movement of a mass within a linear haptic device, according to at least some embodiments of the present disclosure;

FIG. 4 is a representation of a constant resonant waveform, according to at least some embodiments of the present disclosure;

DETAILED DESCRIPTION

Figure 1:
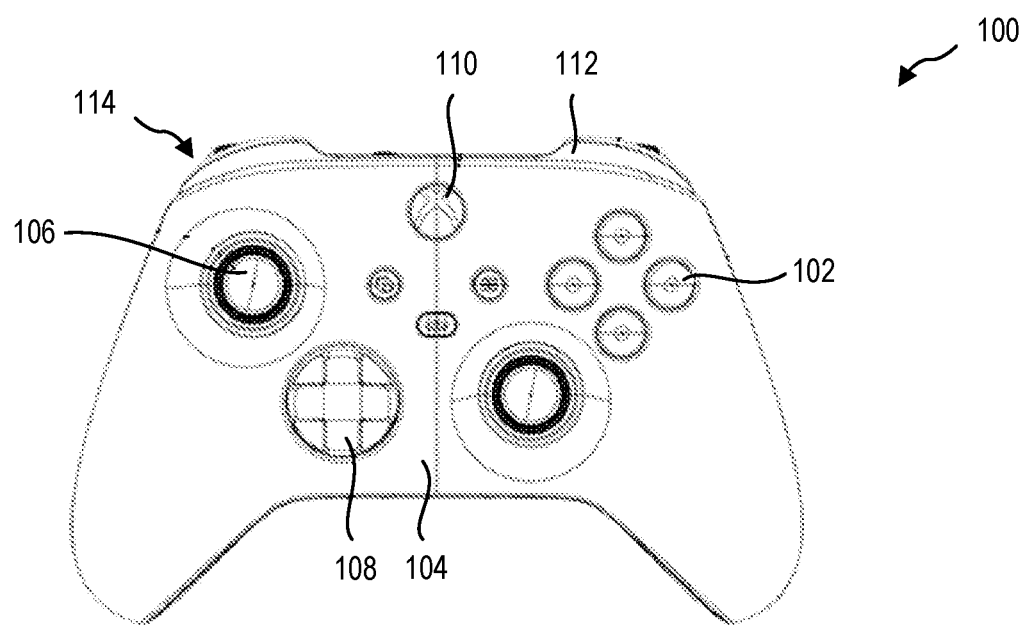
FIG. 1-1 is a top view of an electronic device controller.

The present disclosure relates generally to systems and methods for providing haptic feedback to a user with a haptic device. More particularly, the haptic devices described herein are configured to provide haptic feedback to a user based on haptic information from a local computing device, remote computing system (cloud/internet), or a specialized video game console. In some embodiments, a haptic device according to the present disclosure is part of an electronic device controller that may be in data communication with an electronic device, such as a personal computer, cloud service, or video game console. In some embodiments, an electronic device controller is in data communication via a wired data connection. In other embodiments, the electronic device controller is in wireless data communication.

In some embodiments, a haptic device according to the present disclosure is a linear haptic device. For example, a linear haptic device is any haptic device configured to accelerate a mass in a linear motion. The linear haptic device may oscillate the mass within a housing to create a shaking sensation. The linear haptic device may accelerate the mass once to create a click sensation. In some examples, a linear haptic device includes any of a linear resonant actuator (LRA), voice coil actuator (VCA), piezo electric actuators (PEA), and other electromagnetic actuators or motor that accelerate a mass with a linear acceleration. The duration, amplitude, and frequency of the waveform produced by the acceleration and/or oscillation of the mass in the haptic device can simulate or suggest a variety of haptic feedbacks to a user.

In some embodiments, the haptic device is used to simulate a haptic event, such as an in-software event, experience, action, or object. For example, the electronic device controller may be a user input device to a computing device or electronic gaming console. The computing device or electronic gaming console may have an interactive software application stored thereon that, when executed by the computing device or electronic gaming console, simulates a virtual environment with which the user can interact. When an avatar or other user-proxy interacts with the virtual environment, haptic feedback through the electronic device controller may convey that haptic event to the user. While the present disclosure will primarily reference virtual environments, in other examples, the electronic device controller may be a user input device to a machine or other device that moves and interacts with the physical environment. The electronic device controller may control or operate at least a portion of the machine, and when the machine interacts with the physical environment, haptic feedback through the electronic device controller may convey that haptic event to the user.

In a particular example, the electronic device controller may allow the user to operate a power drill (either virtual or physical). In some embodiments, the haptic device may simulate the haptic event of the vibrations of drilling into a plank of wood by recreating the haptic event via haptic devices at the same frequency, the same duration, the same amplitude, or combinations thereof. However, in some embodiments, the haptic event can be suggested to the user by haptic feedback that is close enough to the properties of the haptic event that the user perceives the haptic feedback as corresponding to the haptic event. For example, a drill may vibrate at a frequency of 100 Hertz (Hz) in the virtual environment, and the haptic device may recreate that haptic event with haptic feedback of 100 Hz at the haptic device. In other examples, the haptic device may provide haptic feedback of 80 Hz. The frequency may be close enough to the haptic event that the user, while hearing the drill and seeing a visualization of the drill on a display device, perceives the haptic feedback through the electronic device as correlating to the haptic event.

Because the haptic feedback needs only to be close enough to the haptic event, in combination with the audio and video information provided to the user, haptic devices according to the present disclosure may be efficiently driven at a resonant frequency to conserve power while still providing acceptable haptic feedback. In some embodiments, a perceived frequency can be lower than the resonant frequency by varying the amplitude of the haptic device according to an envelope of a requested haptic events.

For example, a resonant frequency of a haptic device may be approximately 200 Hz, while a haptic event may have a frequency of 30 Hz. By driving the haptic device at the resonant frequency (200 Hz) and varying the amplitude of the haptic device with peak amplitudes at 30 Hz, the haptic device can operate at the efficient resonant frequency while approximating a 30 Hz haptic event.

Referring now to FIG. 1, in some embodiments, an electronic device controller 100 includes a plurality of input buttons located on or in a body 104 of the electronic device controller 100 with at least one directional input device. The directional input devices may include one or more analog thumbsticks 106 and/or one or more directional control pads 108. The input buttons may include face buttons 102, one or more menu or system buttons 110, shoulder buttons 112, trigger buttons 114, rear paddles, etc.

The thumbsticks 106 and/or directional control pads 108 may be used to control the movement of an avatar or cursor in a two- or three-dimensional virtual environment. The input buttons may be used to provide action commands (e.g., jump, crouch, defend, attack) to an avatar and/or interact with the environment. For example, a face button 102 may be used to provide a jump command to an avatar in an adventure game application, while an analog trigger button 114 may allow a user to precisely modulate a brake input for a racing game application.

Figures 1, 2:
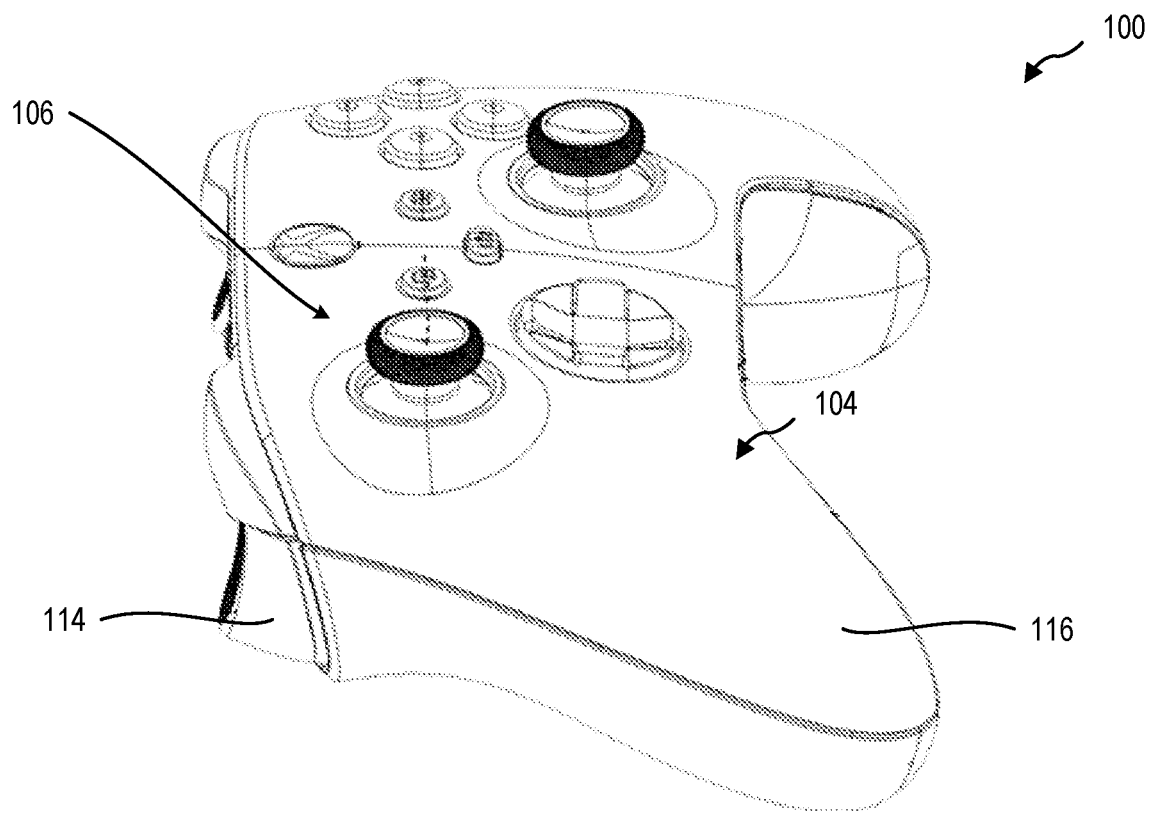
Figures 1, 2:
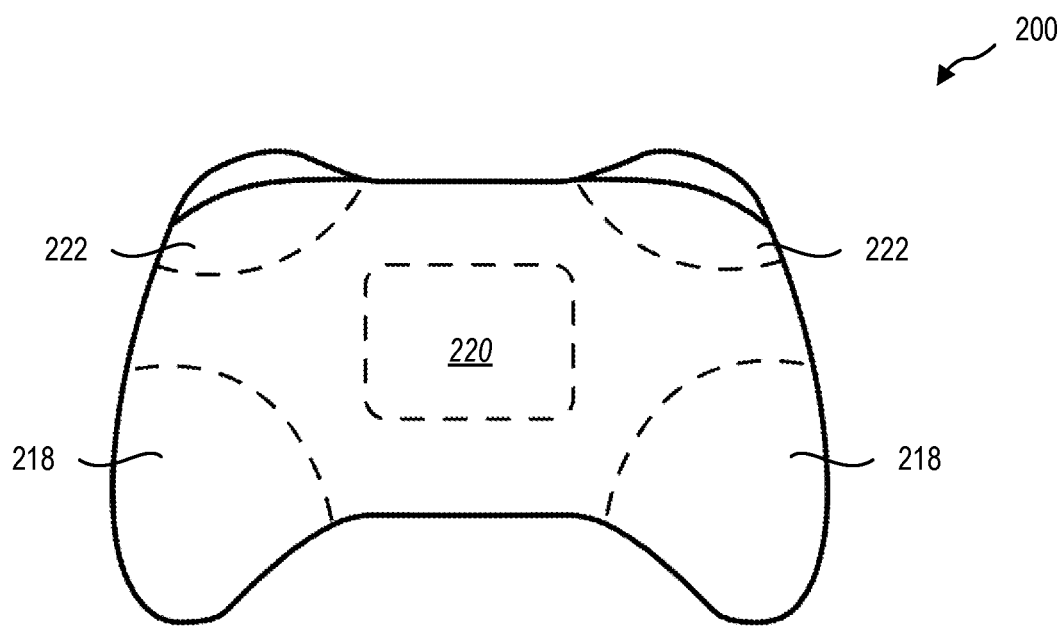
Figure 2:
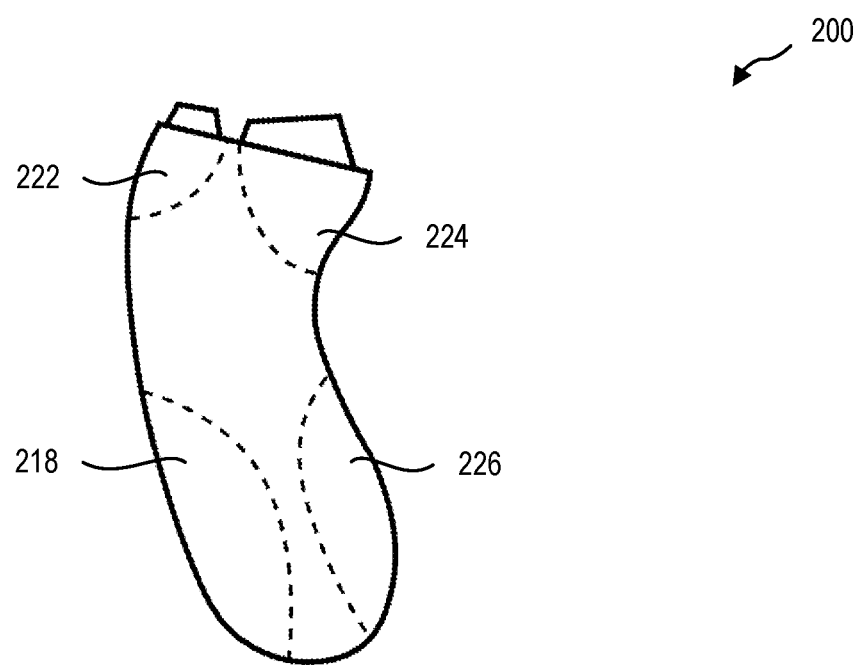

FIG. 1-2 is a side perspective view of the electronic device controller 100 of FIG. 1-1. The electronic device controller 100 may include one of more haptic devices located in the body 104. In some embodiments, the haptic device imparts haptic feedback to the surface of the body 104, such as on a grip 116 of the body 104, through which the user's palm may experience the haptic feedback. In some embodiments, haptic device imparts haptic feedback to a directional input device, such as a thumbstick 106, or to an input button, such as a trigger button 114. In at least one embodiment, a haptic device in or in communication with the trigger button 114 may convey haptic events, such as changes in road surface during braking in the prior example. An electronic device controller 100 may include a plurality of haptic devices in different locations, orientations, and configurations to provide a variety of haptic feedback to the user.

FIG. 2-1 is a schematic representation of an embodiment of haptic regions of an electronic device controller 200. FIG. 2-2 is a side view of the electronic device controller of FIG. 2-1 with additional haptic regions. FIG. 2-1 is a front view of an electronic device control 200 without directional input devices or face buttons for ease of viewing the designated haptic regions. In some embodiments, an electronic device controller 200 includes front grip regions 218, a main body region 220, shoulder regions 222, trigger regions 224, rear grip regions 226, other haptic regions, or combinations thereof. In some embodiments, an electronic device controller 200 includes haptic devices in or in communication with directional input devices and/or input buttons, as described herein.

The haptic regions of the electronic device controller 200 may provide haptic feedback to different regions of the user's hands and simulate or suggest different types of haptic events. For example, haptic feedback in the front grip regions 218 may alternate between a left front grip region 218 and a right front grip region 218 to simulate or suggest footsteps in a virtual environment. Longer duration haptic feedback on the front grip regions 218 may indicate footsteps from a larger entity or avatar, such as an elephant, in the virtual environment. In some examples, haptic feedback in the shoulder regions 222 (located on the top edge of the body) may simulate or suggest rain falling on the user's avatar. In some examples, haptic feedback in the main body region 220 may indicate a generalized or global haptic event, such as an explosion or earthquake in the virtual environment.

In some embodiments, different haptic devices are located in different haptic regions of the electronic device controller 200, such as different resonant frequencies, different amplitudes, different orientations, or different configurations between the haptic regions. As described herein, a linear haptic device may accelerate and/or oscillate a mass in a linear motion, and each linear haptic device may have a different resonant frequency.

Figures 1, 3:
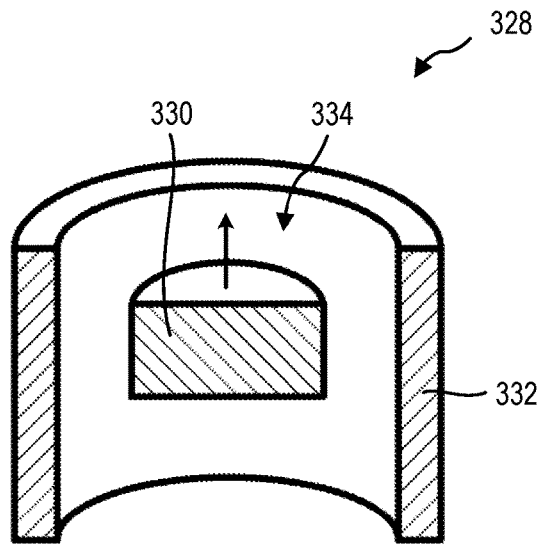
Figures 2, 3:
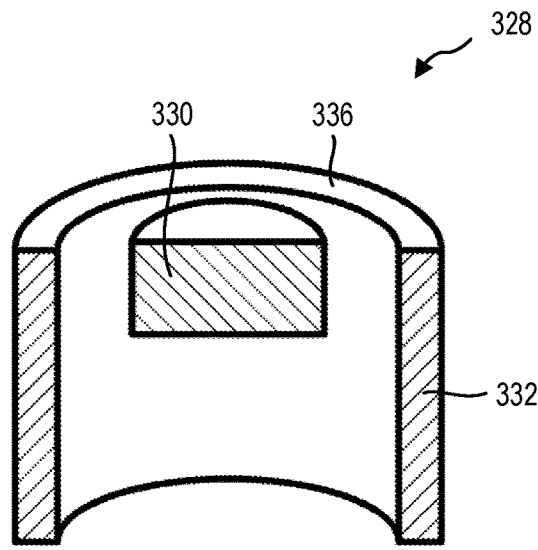
Figure 3:
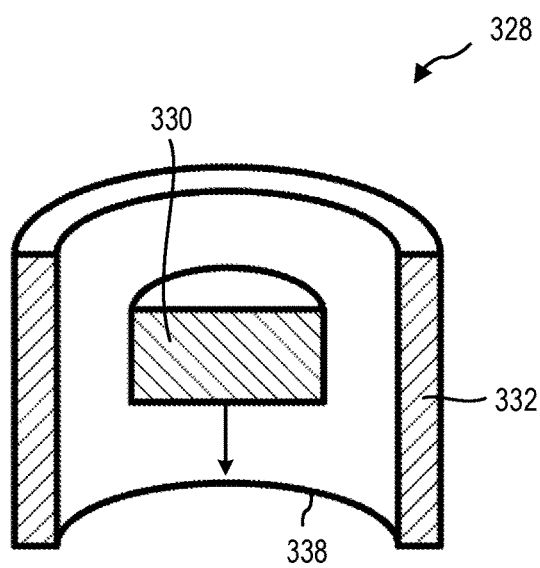
Figures 3, 4:
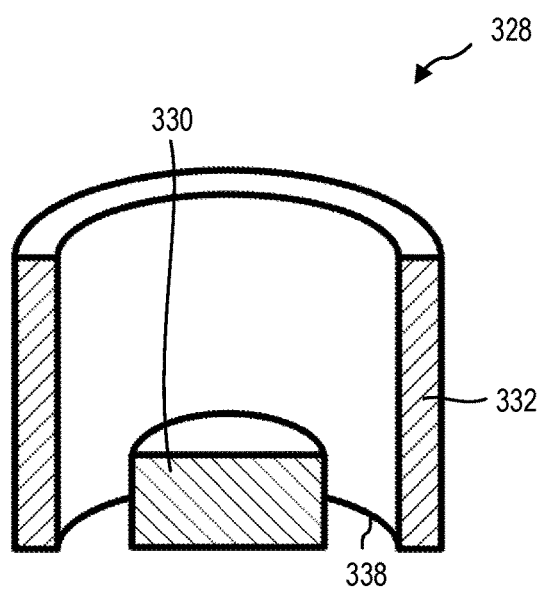
Figure 4:
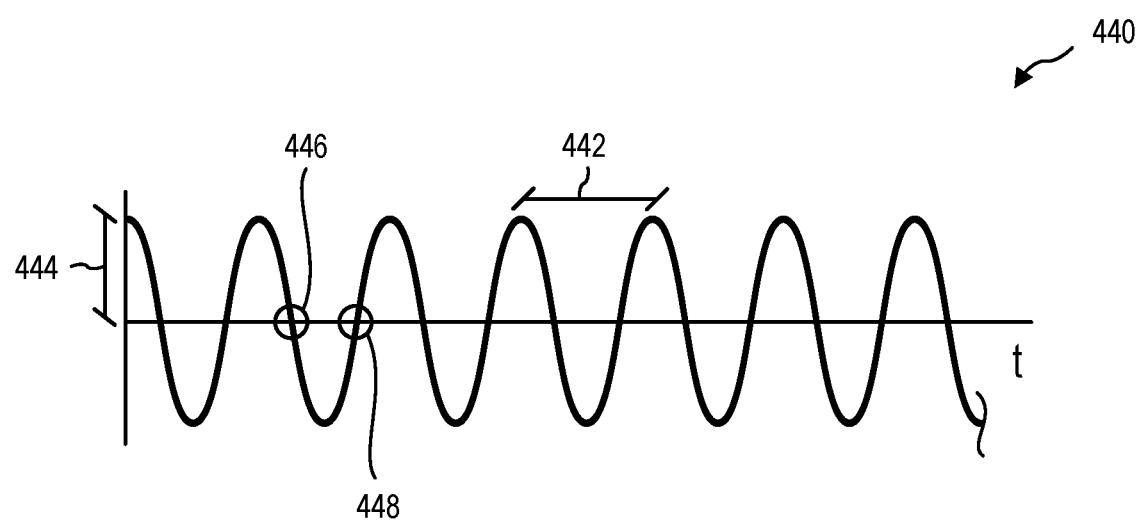

FIG. 3-1 through 3-4 are side cross-sectional views of a linear haptic device with an oscillating mass therein. FIG. 3-1 is a side cross-sectional view of a linear haptic device 328. The linear haptic device 328 moves a mass 330 to generate impulses that provide the haptic feedback. In some embodiments, an electromagnet 332 generates a magnetic field in a bore 334 of the linear haptic device 328. The mass 330 experiences a magnetic force in response to the presence of the magnetic field accelerating the mass 330 in a first direction in the bore 334.

The electromagnet may then change a direction of the magnetic field and apply a magnetic force in the opposite direction. FIG. 3-2 illustrates the mass 330 reaching a first end 336 of the electromagnet 332 before slowing and stopping proximate the first end 336 due to a restoring force. In some embodiments, a magnetic biasing element, such as a permanent magnet, applies the restoring force. In some embodiments, a mechanical biasing element, such as a spring or a bushing, applies the restoring force. After stopping proximate the first end 336, the mass 330, in some embodiments, accelerates away from the first end 336 toward a center of the bore 334.

FIG. 3-3 illustrates the mass 330 passing through the center of the bore 334 with an impulse applied to the mass 330 to accelerate the mass 330 through the bore 334. The mass 330 moves through the bore 334 toward a second end 338 of the bore 334, as shown in FIG. 3-4. By oscillating through the bore 334, the mass 330 shakes the linear haptic device 328 to create haptic feedback in response to an applied electric current. The magnetic field generated by the electromagnet 332 may determine the speed, frequency, and amplitude of the oscillations through the linear haptic device 328.

FIG. 4 is an embodiment of a waveform 440 of a linear haptic device at a resonant frequency. A linear haptic device has an inherent resonant frequency of the mass in the linear haptic device based upon the properties of the mass, magnet(s), materials, other components, manufacturing tolerances, etc. In some embodiments, manufacturing tolerances cause up to a 20% variation (+10%) in the natural resonant frequency of similarly specified linear haptic devices. A single linear haptic device may exhibit variations in the natural resonant frequency based at least partially on age or wear of the linear haptic device, temperature of the linear haptic device, orientation of the linear haptic device, etc. In some embodiments, systems and methods according to the present disclosure calculate or measure the dynamic resonant frequency of the haptic device to adapt the drive frequency of the magnetic field to the dynamic resonant frequency.

A linear haptic device, such as an LRA or VCA, has a natural resonant frequency at which the harmonics of the linear haptic device allow the linear haptic device to continue oscillating with the least input energy. For example, an impulse that is timed at the natural resonant frequency of the mass through the bore of the linear haptic device accelerates the mass through bore with the energy loss. Similar to a pendulum motion, the mass experiences a restoring force that urges the mass back toward the center of the bore (such as illustrated in FIG. 3-3). The impulse applied to the mass can maintain or change the amplitude of the oscillation of the mass.

In some embodiments, the waveform 440 is output by a haptics controller to the linear haptic device as a series of electrical signals to control the electromagnet of the linear haptic device. The output waveform 440 is generated at the linear haptic device by providing input energy to a mass via the magnetic field generated in response to the electrical signals. By applying a magnetic force to the mass at the resonant frequency in alternating directions as the mass oscillates, the mass is moved with the least input energy and least power consumption. More specifically, some embodiments apply the magnetic force while the mass is near the center of the bore and while the net restoring force (i.e., that applied near either end of the bore) is approximately zero. As the restoring force may be a permanent magnet or a mechanical biasing element, the restoring force of the linear haptic device requires little or no input energy. To cause the mass to oscillate at a frequency other than the resonant frequency, additional input energy is needed to overcome or add to the restoring force.

As described herein, because the resonant frequency of the linear haptic device may be different from the specified resonant frequency for the device and/or can change with age, environment conditions, temperature, orientation, etc., a dynamic resonant frequency is calculated by the electronic device controller or the electronic device to adjust an input frequency to create the waveform 440 of FIG. 4. A constant waveform 440 may have a constant frequency 442 and a constant amplitude 444. The electromagnetic (EM) impulses 446, 448 balance drag or damping in the linear haptic device to keep the mass oscillating at the same amplitude. In some embodiments, the EM impulses 446, 448 are greater than or less than the drag or damping in the linear haptic device, and the amplitude changes. However, the frequency remains the same given the same restoring force(s) of the linear haptic device. Therefore, amplitude can be modulated through changes in the current to the electromagnet, while the linear haptic device continues to oscillate at the resonant frequency.

Figure 5:
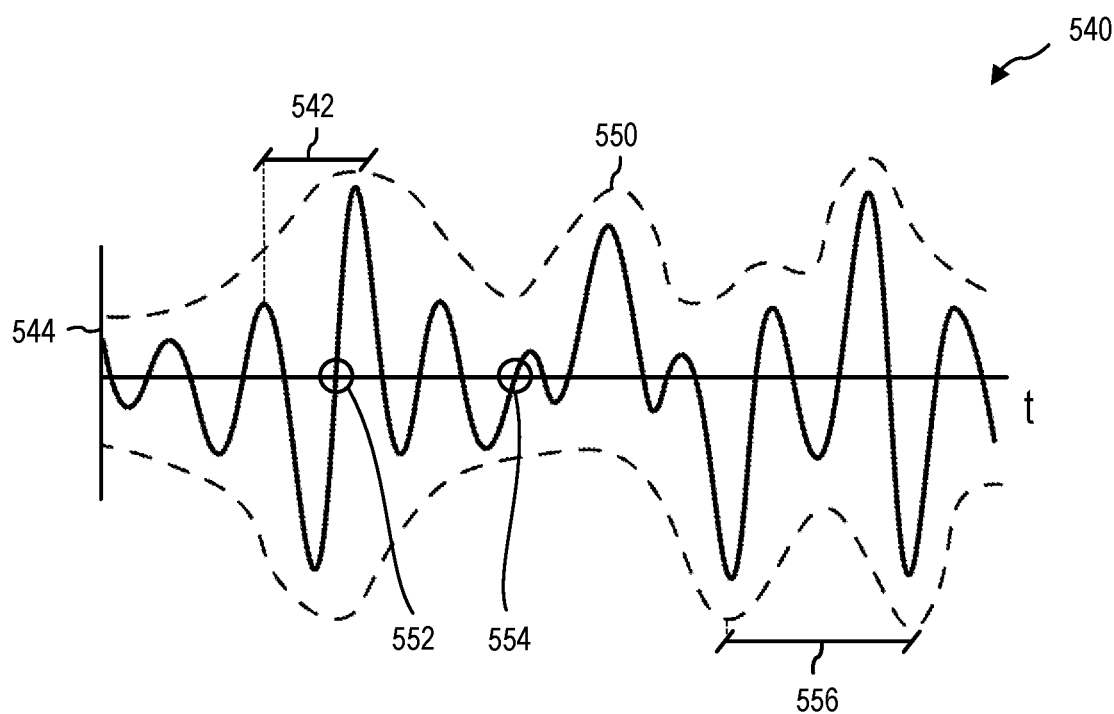
FIG. 5 is a representation of an amplitude envelope mapped to a resonant waveform, according to at least some embodiments of the present disclosure.

FIG. 5 is an embodiment of a waveform 540 of a linear haptic device with varying amplitude at a resonant frequency 542. In some embodiments, an electronic device or software application running thereon sends haptic information to the electronic device controller to provide haptic feedback via one or more linear haptic devices of the electronic device controller. In some embodiments, a processor and/or haptic controller of the electronic device controller receive the haptic information.

The processor and/or haptic controller of the electronic device then maps the haptic information (e.g., the requested waveform) onto a resonant waveform of the linear haptic device (such as described in FIG. 4) to create an output waveform 540. In some embodiments, the haptic information is mapped to the resonant waveform as an amplitude envelope 550 to the resonant waveform. For example, the processor and/or haptic controller instructs the linear haptic device to oscillate at the resonant frequency 542 but change amplitude 544 so that the perceived haptic feedback sensed by the user varies according to the haptic information.

In some embodiments, the EM impulses 552, 554 change while the restoring force of the linear haptic device remains the same. In such an example, the frequency of the oscillations does not change, while the amplitude varies. While the wavelength of the resonant frequency 542 is not the same as the wavelength 556 of the haptic information and requested waveform, the user of the electronic device controller perceives the haptic feedback in context of the audio and video information also provided by the electronic device. Therefore, the user perceives the haptic feedback as having the amplitude envelope 550, even when the linear haptic device operates at the resonant frequency 542.

Figure 6:
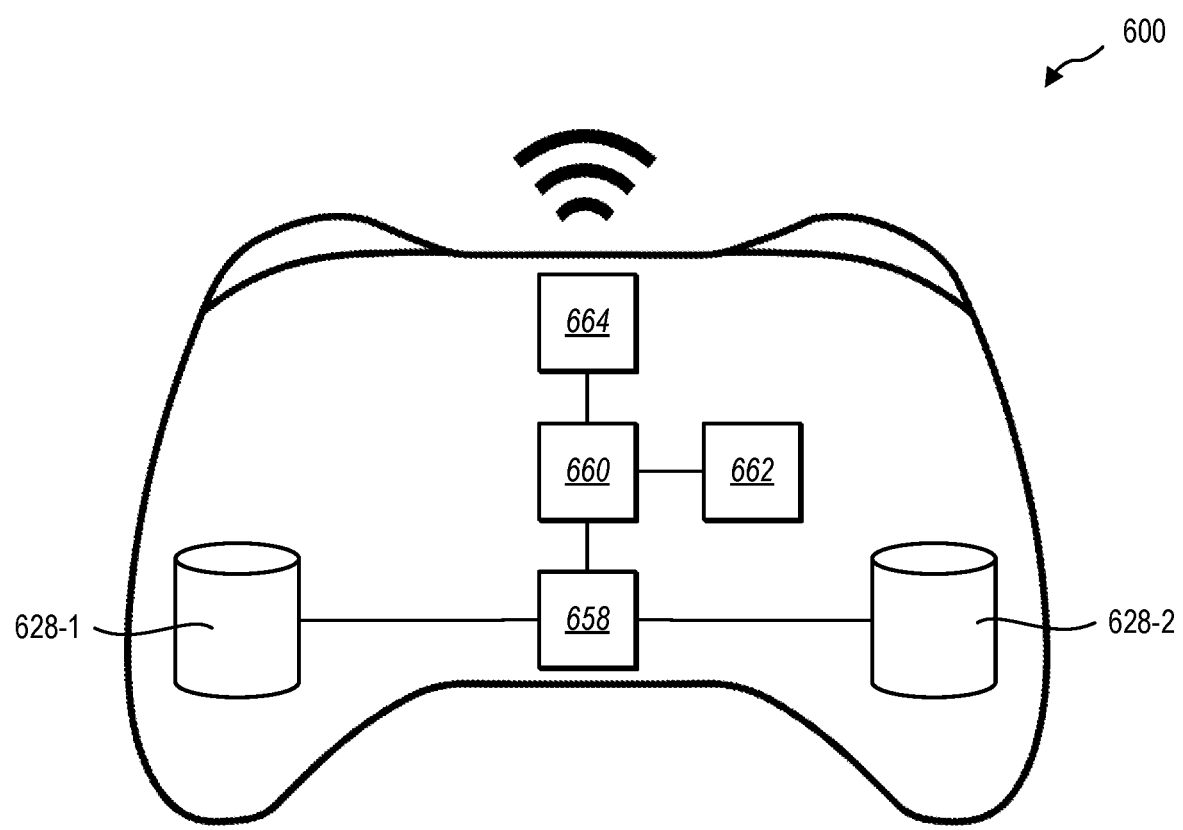
FIG. 6 is a schematic diagram of the components of an electronic device controller, according to at least some embodiments of the present disclosure.

FIG. 6 is a schematic diagram of an embodiment of an electronic device controller 600, according to some embodiments of the present disclosure. In some embodiments, an electronic device controller 600 includes at least one linear haptic device 628-1 and a haptic controller 658 in communication with the linear haptic device 628-1. In some examples, a haptic controller 658 is in electrical communication with a plurality of linear haptic devices 628-1, 628-2. In some examples, each linear haptic device 628-1, 628-2 has a dedicated haptic controller. In some examples, at least one linear haptic device 628-1, 628-2 of the electronic device controller has a dedicated haptic controller and at least two other linear haptic devices share a haptic controller. In some embodiments, the haptic controller 658 is configured to measure and/or determine a dynamic resonant frequency of a linear haptic device 628-1, 628-2 at preset time intervals or on-command.

In some embodiments, the electronic device controller includes a processor 660 in communication with the haptic controller(s). In some examples, the processor 660 is a general-use processor. In some examples, the processor 660 is a system on chip or application specific integrated circuit. In some examples, a haptic controller is integrated with the processor 660 (such as in a system on chip or application specific integrated circuit).

The processor 660 is further in communication with a hardware storage device 662 having instructions stored thereon that, when executed by the processor, cause the electronic device controller to perform at least part of any method described herein. In some embodiments, the hardware storage device 662 is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

In some embodiments, the processor 660 is further in communication with a communication device 664. In some examples, the communication device 664 is a wired communication device that allows communication between the electronic device controller and an electronic device via a wired connection. In some examples, the communication device 664 is a wireless communication device that allows communication between the electronic device controller and an electronic device via a wireless connection. In some embodiments, the communication device 664 communicates directly with the electronic device, such as via a local radio frequency (RF) communication with an antenna of the electronic device. In some examples, the communication device is integrated with the processor 660. In some embodiments, the communication device 664 communicates indirectly with the electronic device, such as via a local RF communication with an access point to a network to communication with an electronic device, such as for cloud processing.

Figure 7:
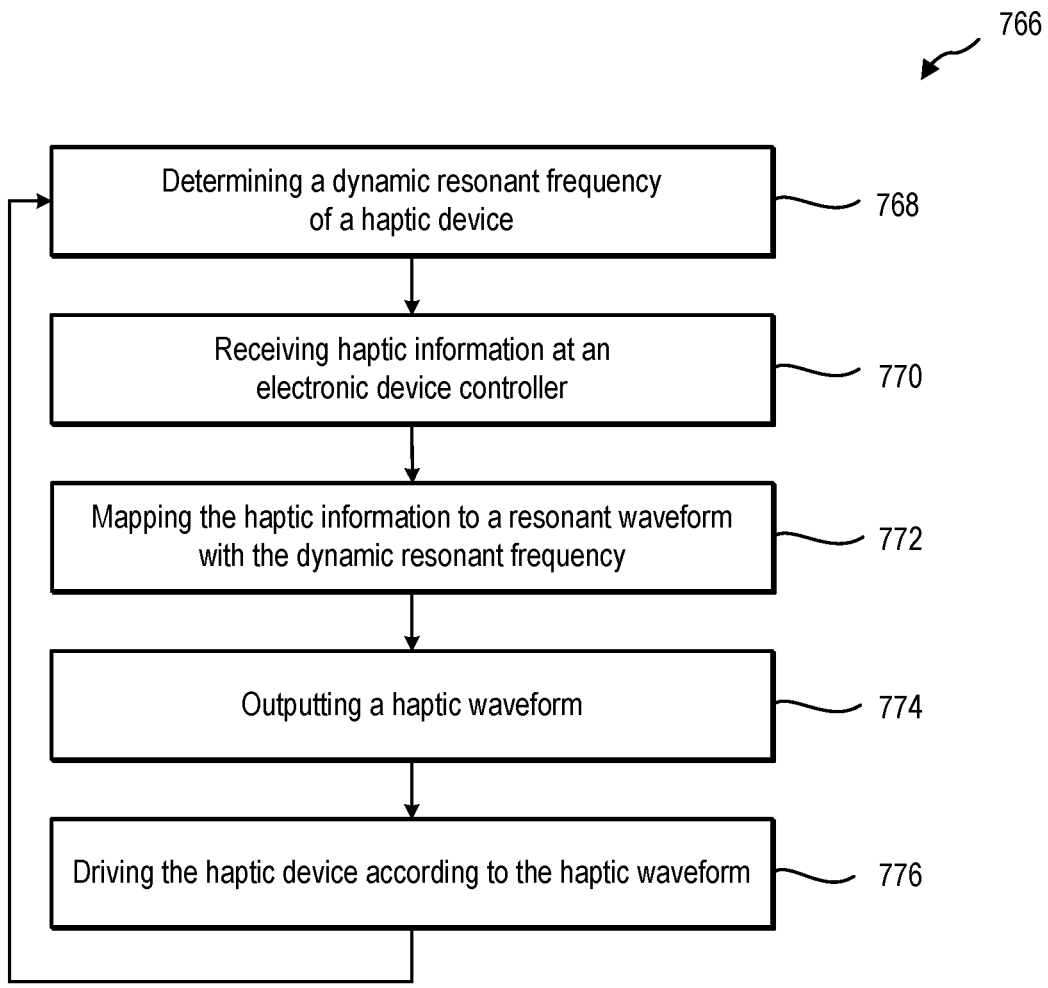
FIG. 7 is a flowchart illustrating a method of providing haptic feedback to a user, according to at least some embodiments of the present disclosure.

As described herein, the hardware storage device 662 of the electronic device controller 600 has instructions stored thereon that cause the electronic device controller 600 to produce haptic feedback for a user according to haptic information received by the electronic device controller. FIG. 7 is a flowchart illustrating an embodiment of a method 766 of providing haptic feedback to a user. In some embodiments, a method 766 includes determining a dynamic resonant frequency of a haptic device at 768. Determining a dynamic resonant frequency may include measuring the dynamic resonant frequency during operation of the linear haptic device. In some examples, determining a dynamic resonant frequency may include measuring the dynamic resonant frequency upon startup of the electronic device controller. In some examples, determining a dynamic resonant frequency may include measuring the dynamic resonant frequency in response to receiving haptic information at the electronic device controller. In some examples, determining a dynamic resonant frequency may include measuring the dynamic resonant frequency at predetermined time intervals.

The method 766 further includes receiving haptic information at an electronic device controller at 770 and mapping the haptic information to the dynamic resonant frequency at 772. For example, mapping the haptic information to the dynamic resonant frequency may include mapping an amplitude envelope to a resonant waveform, such as described in relation to FIG. 5. Mapping the haptic information to the dynamic resonant frequency may be performed at the haptic controller. Mapping the haptic information to the dynamic resonant frequency may be performed at a processor. After mapping the haptic information to the dynamic resonant frequency, the method includes outputting a haptic waveform at 774 and driving the haptic device according to the haptic waveform at 776. In some examples, the haptic waveform may be calculated by the haptic controller and driving the haptic device may include transmitting electrical signals from the haptic controller to the linear haptic device according to the haptic waveform. In some examples, the haptic waveform may be calculated by the processor, and the processor outputs the haptic waveform to the haptic controller. The haptic controller may then drive the haptic device by transmitting electrical signals from the haptic controller to the linear haptic device according to the haptic waveform.

In some embodiments, the haptic information received from the electronic device is at least partially based on an application programming interface (API) provided to the software running on the electronic device. For example, the haptic information may have a waveform that changes based on a time step set by the API. In some embodiments, the time step is based at least partially on the dynamic resonant frequency. For example, the electronic device controller may determine the dynamic resonant frequency of a linear haptic device and map the haptic information to the resonant waveform based on a time step equal to the dynamic resonant frequency. In some examples, the electronic device controller may determine the dynamic resonant frequency of a linear haptic device and transmit the dynamic resonant frequency and/or the time step to the electronic device. The haptic information transmitted to the electronic device controller may then be based at least partially on the dynamic resonant frequency and/or the time step. In some embodiments, mapping the haptic information includes downsampling a high sample-rate waveform of the haptic information based at least partially on the time step and/or the dynamic resonant frequency.

Figure 8:
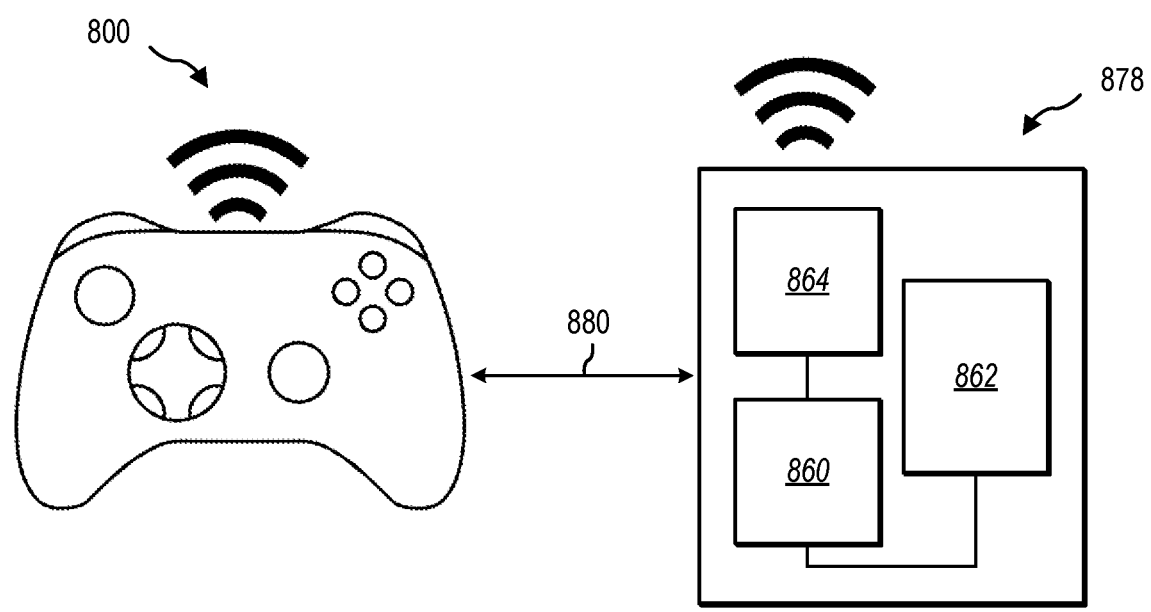
FIG. 8 is a system diagram of an electronic device controller communicating with an electronic device, according to at least some embodiments of the present disclosure.

FIG. 8 is a system diagram of an embodiment of an electronic device controller 800 in communication with an electronic device 878. In some embodiments, a system for providing haptic feedback to a user includes an electronic device controller 800 (such as described in relation to FIG. 6) containing at least one linear haptic device (such as described in relation to FIG. 2 through 5) and an electronic device 878 in data communication with the electronic device controller 800. In some embodiments, the electronic device 878 is a general-purpose computer. In some embodiments, the electronic device 878 is a specialized computing device, such as a retail commodity video game console. In some embodiments, the electronic device 878 is a server computer or part of a server blade that is located remotely to the electronic device controller. In such examples, the electronic device controller is in data communication with the electronic device 878 via a network connection.

The electronic device 878 includes at least a processor 860, a hardware storage device 862, and a communication device 864. In some examples, the processor 860 is a general-use processor. In some examples, the processor 860 is a system on chip or application specific integrated circuit. In some examples, a haptic controller is integrated with the processor 860 (such as in a system on chip or application specific integrated circuit).

The processor 860 is further in communication with a hardware storage device 862 having instructions stored thereon that, when executed by the processor, cause the electronic device controller to perform at least part of any method described herein. In some embodiments, the hardware storage device 862 is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

In some embodiments, the processor 860 is further in communication with a communication device 864. In some examples, the communication device 864 is a wired communication device that allows communication between the electronic device and an electronic device controller via a wired connection. In some examples, the communication device 864 is a wireless communication device that allows communication between the electronic device and an electronic device controller via a wireless connection. In some embodiments, the communication device 864 communicates directly with the electronic device controller, such as via a local RF communication with an antenna of the electronic device controller. In some embodiments, the communication device 864 communicates indirectly with the electronic device controller, such as via a local RF communication with an access point to a network to communication with an electronic device controller, such as when the electronic device 878 is part of a cloud server.

In at least one embodiment, the electronic device 878 and the electronic device controller 800 transmit and receive a variety of information 880 therebetween. For example, the electronic device may transmit to the electronic device controller information including one or more of software audio, chat audio, game input protocol (GIP) commands, and other information, such as wake commands or other control information to manage data connection with the electronic device controller. In some embodiments, the haptic information is transmitted with or in a GIP command to the electronic device controller. In some embodiments, the haptic information is determined from software audio transmitted to the electronic device controller. In some embodiments, the haptic information is determined from software audio and subsequently transmitted to the electronic device controller with or in a GIP command. For example, older software, such as legacy or backward compatible electronic games, may lack explicit haptic information and/or lack haptic information to drive non-ERM actuators, and support for haptic feedback to the user can be provided by mapping audio waveforms from the software audio to the resonant waveform, such as described in relation to FIG. 5.

Figure 9:
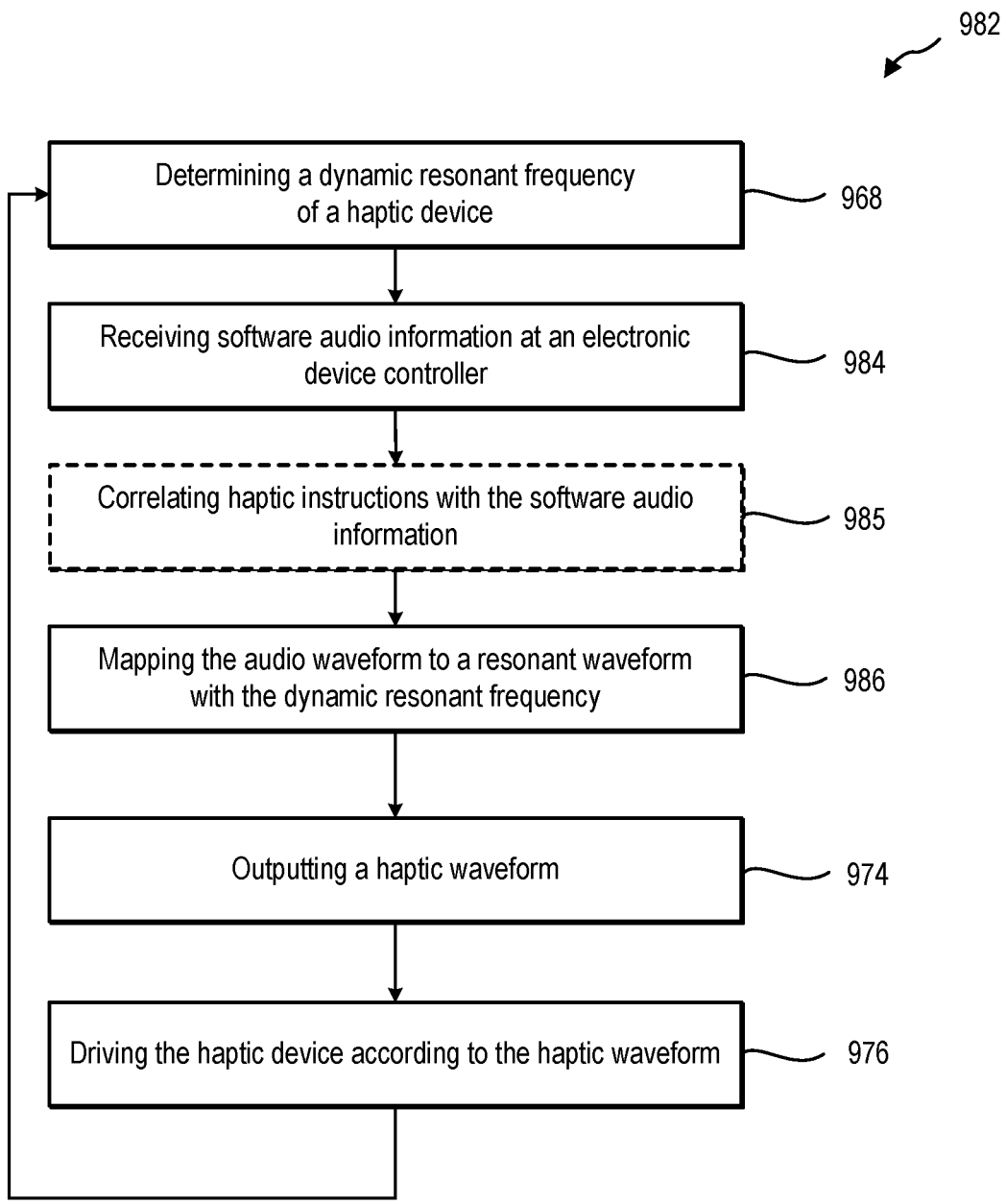
FIG. 9 is a flowchart illustrating another method of providing haptic feedback to a user, according to at least some embodiments of the present disclosure.

FIG. 9 is a flowchart illustrating an embodiment of a method 982 of providing haptic feedback to a user based on an audio input. In some embodiments, the method 982 includes determining a dynamic resonant frequency of a haptic device at 968. Determining a dynamic resonant frequency may include measuring the dynamic resonant frequency during operation of the linear haptic device. In some examples, determining a dynamic resonant frequency may include measuring the dynamic resonant frequency upon startup of the electronic device controller. In some examples, determining a dynamic resonant frequency may include measuring the dynamic resonant frequency in response to receiving haptic information at the electronic device controller. In some examples, determining a dynamic resonant frequency may include measuring the dynamic resonant frequency at predetermined time intervals.

The method further includes receiving software audio information at an electronic device controller at 984. In some embodiments, the software audio information has an audio waveform. For example, the audio waveform may have an amplitude and a frequency and/or wavelength. The audio waveform may be mapped to the dynamic resonant frequency. In some embodiments, the amplitude of the audio waveform is scaled relative to an amplitude of the haptic device. For example, a maximum amplitude of the audio waveform may be scaled to be equal to a maximum amplitude of the haptic device. In some examples, the maximum amplitude of the audio waveform may be scaled to be equal to less than a maximum amplitude of the haptic device, such as 90%, 80%, or 50% of the maximum amplitude of the haptic device to limit wear on the haptic device. In some embodiments, the amplitude of the audio waveform may be scaled linearly to an amplitude of the haptic device. For example, an amplitude of the audio waveform that is 50% of the maximum amplitude of the audio waveform may be scaled to be 50% of the maximum amplitude of the haptic device. In some embodiments, the amplitude of the audio waveform may be scaled non-linearly to an amplitude of the haptic device. For example, an amplitude of the audio waveform that is 80% of the maximum amplitude of the audio waveform may be scaled to be 50% of the maximum amplitude of the haptic device to provide greater contrast in the haptic feedback based on the audio waveform.

In some embodiments, the method 982 optionally includes correlating legacy (e.g., non-linear) haptic instructions with the software audio information at 985. In some embodiments, software audio information can translate incorrectly to haptic events, such as low-frequency character dialog or certain frequencies of the software music or ambient audio. To limit unwanted audio-to-haptic conversions, the method 982 may limit the translation of software audio information to haptic information for the haptic device (s) based at least partially on the presence of legacy haptic instructions provided by the software.

For example, the software may provide (such as in a GIP command) legacy haptic instructions to operate a non-linear haptic device, such as an eccentric rotating mass (ERM) haptic device (as will be described in relation to FIG. 10 and FIG. 11). The duration and timing of the legacy haptic instructions may be correlated to the software audio to instruct the processor of the electronic device controller to perform audio-to-haptic translation during the timing and duration of the legacy haptic instructions. In a particular example, a legacy haptic instruction provided to the electronic device controller informs the electronic device controller to provide a haptic feedback during a cutscene in a video game. The legacy haptic instruction instructs the controller to provide haptic feedback during an explosion at the start of the cutscene and during a building collapse at the end of the cutscene. Between the two haptic events (the explosion and the building collapse), the soundtrack increases in volume and the characters speak loudly to one another.

In some embodiments, the method 982 correlates the software audio information to the timing and duration of the legacy haptic instructions to provide haptic feedback using a linear haptic device(s) and/or a legacy haptic device during the timing and duration of the legacy haptic instructions based at least partially on the software audio information while ignoring the software audio information during other periods. In doing so, the method 982 may allow the electronic device controller to provide improved haptic feedback to the user when a developer intended, and the method limits false positives for the creation of new haptic events unintended by the developer.

Similar to as described in relation to FIG. 5, mapping the audio information or audio waveform to the resonant waveform with a dynamic resonant frequency at 986 may include mapping an amplitude envelope to a resonant waveform. Mapping the audio information or audio waveform to the dynamic resonant frequency may be performed at the haptic controller. Mapping the audio information or audio waveform to the dynamic resonant frequency may be performed at a processor. After mapping the audio information or audio waveform to the dynamic resonant frequency, the method includes outputting a haptic waveform at 974 and driving the haptic device according to the haptic waveform at 976. In some examples, the haptic waveform may be calculated by the haptic controller and driving the haptic device may include transmitting electrical signals from the haptic controller to the linear haptic device according to the haptic waveform. In some examples, the haptic waveform may be calculated by the processor, and the processor outputs the haptic waveform to the haptic controller. The haptic controller may then drive the haptic device by transmitting electrical signals from the haptic controller to the linear haptic device according to the haptic waveform.

Figure 10:
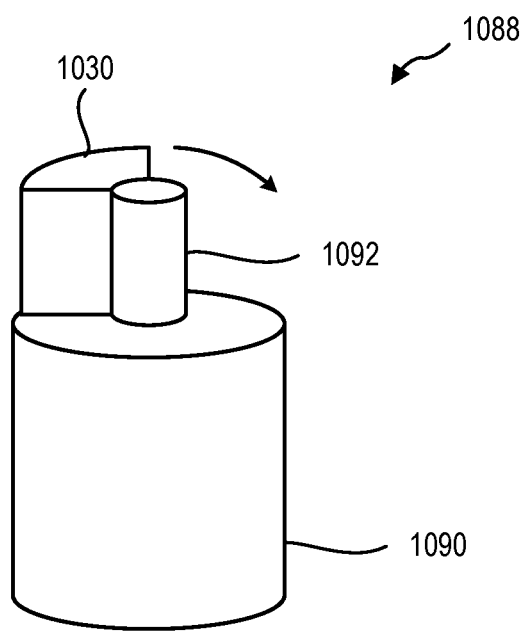
FIG. 10 is a perspective view of an eccentric rotating mass haptic device, according to at least some embodiments of the present disclosure.

FIG. 10 is a perspective view of an embodiment of an eccentric rotating mass ERM haptic device 1088. The ERM haptic device 1088 provides low frequency, slow response haptics. The ERM haptic device 1088 includes a motor 1090 configured to rotate a driveshaft 1092. The driveshaft 1092 is rotationally fixed to a mass 1030. The rotating mass 1030 is off-center from the rotational axis of the driveshaft 1092.

ERM haptic devices produce an uneven centripetal force which causes the ERM haptic device to move backwards and forwards. This movement also produces a side to side vibration, i.e., lateral vibrations. ERM haptic devices typically contain a larger mass than a linear haptic device, which allows for more powerful haptic feedback, but with lower frequency and with slower response times. In contrast, linear haptic devices can allow for rapid changes to amplitude that can modulate the haptic feedback and/or start and stop the haptic feedback faster than an ERM. In some embodiments, an ERM haptic device can be used in conjunction with a linear haptic device to provide a combination of powerful and advanced haptic feedback.

Figure 11:
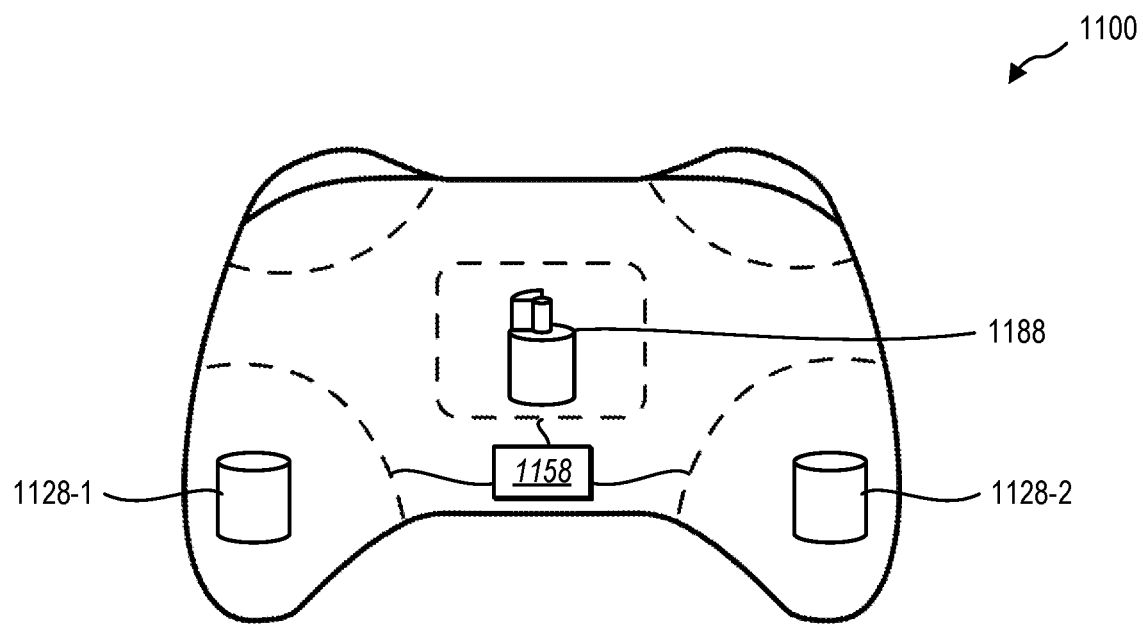
FIG. 11 is a schematic diagram of an electronic device controller with a hybrid haptic device array, according to at least some embodiments of the present disclosure.

FIG. 11 is a schematic diagram of an embodiment of an electronic device controller 1100 with a hybrid haptic array. In some embodiments, an electronic device controller 1100 includes at least one linear haptic device 1128-1, 1128-2, at least one ERM haptic device 1188, and a haptic controller 1158. In some examples, a haptic controller 1158 is in electrical communication with a plurality of haptic devices. In some examples, each haptic device has a dedicated haptic controller. In some examples, at least one haptic device of the electronic device controller has a dedicated haptic controller and at least two other haptic devices share a haptic controller. In some embodiments, the haptic controller is configured to measure and/or determine a dynamic resonant frequency of a linear haptic device at preset time intervals or on-command.

In some embodiments, the electronic device controller 1100 includes a processor (such as described in relation to FIG. 6) in communication with the haptic controller(s). In some examples, the processor is a general-use processor. In some examples, the processor is a system on chip or application specific integrated circuit. In some examples, a haptic controller is integrated with the processor (such as in a system on chip or application specific integrated circuit).

The processor is further in communication with a hardware storage device (such as described in relation to FIG. 6) having instructions stored thereon that, when executed by the processor, cause the electronic device controller to perform at least part of any method described herein. In some embodiments, the hardware storage device is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

In some embodiments, the processor is further in communication with a communication device (such as described in relation to FIG. 6). In some examples, the communication device is a wired communication device that allows communication between the electronic device controller and an electronic device via a wired connection. In some examples, the communication device is a wireless communication device that allows communication between the electronic device controller and an electronic device via a wireless connection. In some embodiments, the communication device communicates directly with the electronic device, such as via a local RF communication with an antenna of the electronic device. In some embodiments, the communication device communicates indirectly with the electronic device, such as via a local RF communication with an access point to a network to communication with an electronic device, such as for cloud processing.

In some embodiments, a combination of at least one linear haptic device for high frequency and/or fast response haptic feedback and at least one ERM haptic device for low-frequency and/or slow response haptic feedback can allow an electronic device controller according to the present disclosure to provide powerful and advanced haptic feedback while consuming less electrical power.

Figure 12:
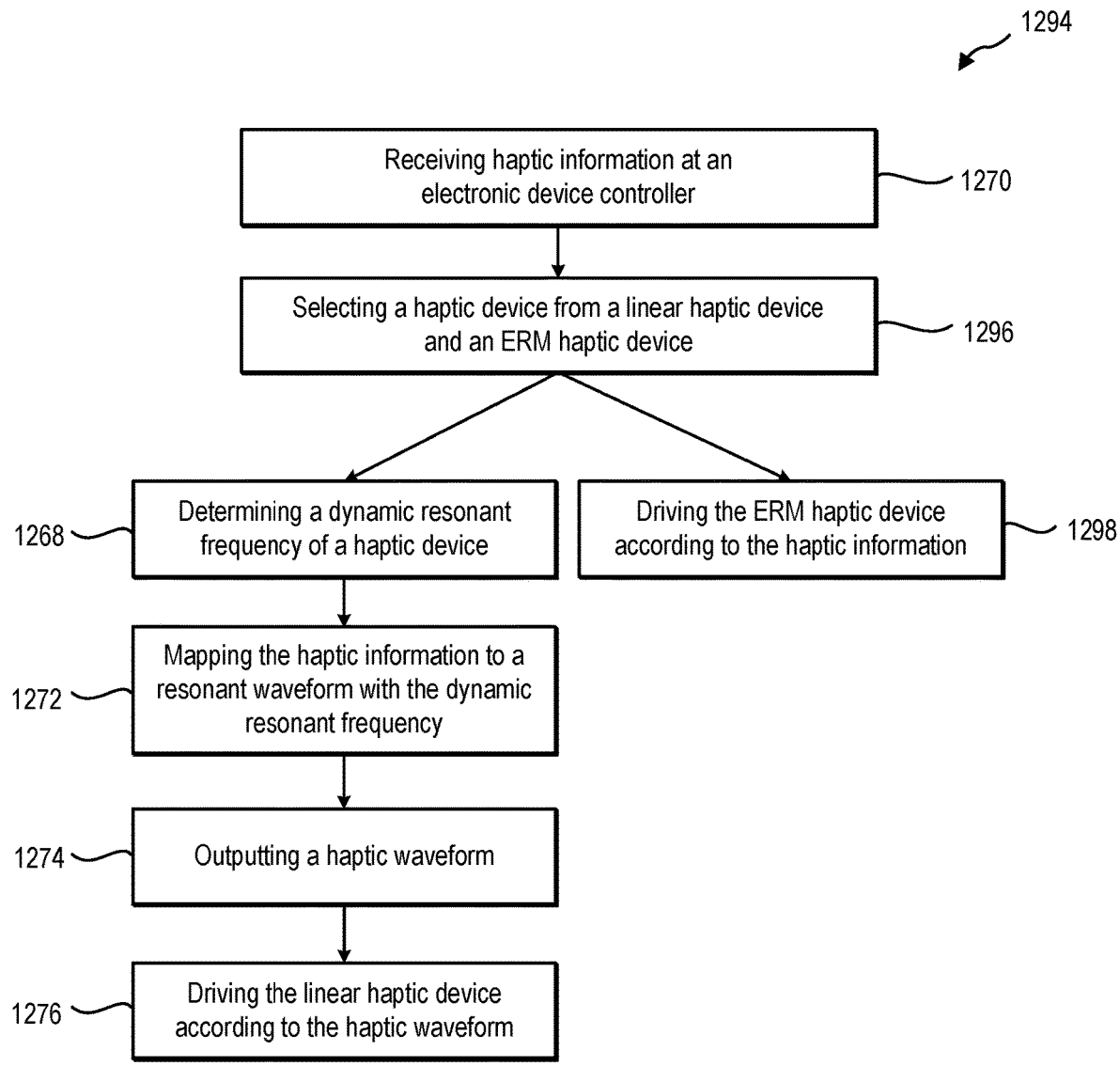
FIG. 12 is a flowchart illustrating a method of providing haptic feedback to a user with a hybrid haptic device array, according to at least some embodiments of the present disclosure.

In some embodiments, the processor and/or haptic controller selects one or both of the linear haptic device and the ERM haptic device to produce the haptic feedback based on the haptic information. FIG. 12 is a flowchart illustrating an embodiment of a method 1294 of providing haptic feedback to a user using a hybrid haptic array. In some embodiments, the method 1294 includes receiving haptic information at 1270 (or determining haptic information from software audio information), such as described in relation to FIG. 7 (and FIG. 9). The method further includes selecting a haptic device from a linear haptic device and an ERM haptic device at 1296.

In some embodiments, selecting the haptic device includes comparing a duration of the haptic information to a threshold duration. For example, a haptic information that is longer than a threshold duration may result in the selection of the ERM haptic device to conserve power in the electronic device controller. Because the moving mass of the ERM haptic device is conventionally greater than that of a linear haptic device, short duration haptic events may consume more power to start and stop the moving mass of the ERM haptic device than that of the linear haptic device. Similarly, the ERM haptic device may consume less power once moving relative to the linear haptic device.

In some embodiments, the selecting the haptic device includes comparing a duration of the haptic information to a threshold response time. For example, a haptic information that is shorter than a threshold response time may result in the selection of the linear haptic device in the electronic device controller. Because the moving mass of the ERM haptic device is conventionally greater than that of a linear haptic device, starting and stopping the rotating mass to recreate short duration haptic events may not be possible or not possible at a desired precision. Similarly, the linear haptic device may accelerate and decelerate the oscillating mass more quickly than the ERM haptic device, allowing haptic feedback with greater fidelity in response to short duration haptic information and/or events.

In some embodiments, selecting the haptic device includes comparing a frequency of the haptic information to a threshold frequency. For example, a haptic information with a frequency less than a threshold frequency may result in the selection of the ERM haptic device more powerfully replicate the low-frequency vibration. Because the frequency of the ERM haptic device is conventionally lower than that of a linear haptic device, low-frequency haptic events may be more readily reproduced by the rotating mass of the ERM haptic device than the smaller and faster oscillation of the linear haptic device. Similarly, the ERM haptic device may provide a more powerful vibration in the haptic feedback due to a larger mass than the linear haptic device. In some embodiments, the low-frequency haptic event is an explosion or other powerful haptic event that may benefit from a larger low-frequency vibration.

In some embodiments, selecting the haptic device includes selecting both of the linear haptic device and the ERM haptic device. For example, haptic information with an amplitude greater than a threshold amplitude may result in the electronic device controller operating both the ERM haptic device and the linear haptic device. In some examples, the linear haptic device may provide a short response time and the ERM haptic device may provide a long duration and powerful vibration. In some embodiments, selecting the haptic device or combination of haptic devices may be at least partially performed by a machine learning model (ML) model or system.

After selecting a linear haptic device at 1296, the method further includes determining a dynamic resonant frequency at 1268 and mapping the haptic information to the dynamic resonant frequency at 1272. For example, mapping the haptic information to the dynamic resonant frequency may include mapping an amplitude envelope to a resonant waveform, such as described in relation to FIG. 5. Mapping the haptic information to the dynamic resonant frequency may be performed at the haptic controller. Mapping the haptic information to the dynamic resonant frequency may be performed at a processor. After mapping the haptic information to the dynamic resonant frequency, the method includes outputting a haptic waveform And driving the haptic device according to the haptic waveform. In some examples, the haptic waveform may be calculated by the haptic controller and driving the haptic device may include transmitting electrical signals from the haptic controller to the linear haptic device according to the haptic waveform. In some examples, the haptic waveform may be calculated by the processor, and the processor outputs the haptic waveform to the haptic controller. The haptic controller may then drive the haptic device by transmitting electrical signals from the haptic controller to the linear haptic device according to the haptic waveform.

In some embodiments, the haptic information received from the electronic device is at least partially based on an application programming interface (API) provided to the software running on the electronic device. For example, the haptic information may have a waveform that changes based on a time step set by the API. In some embodiments, the time step is based at least partially on the dynamic resonant frequency. For example, the electronic device controller may determine the dynamic resonant frequency of a linear haptic device and map the haptic information to the resonant waveform based on a time step equal to the dynamic resonant frequency. In some examples, the electronic device controller may determine the dynamic resonant frequency of a linear haptic device and transmit the dynamic resonant frequency and/or the time step to the electronic device. The haptic information transmitted to the electronic device controller may then be based at least partially on the dynamic resonant frequency and/or the time step. In some embodiments, mapping the haptic information includes downsampling a high sample-rate waveform of the haptic information based at least partially on the time step and/or the dynamic resonant frequency.

The method 1294 further includes outputting the haptic waveform at 1274 and driving the linear haptic device according to the haptic waveform at 1276. When the method 1294 includes selecting the ERM haptic device at 1296, the method 1294 further includes driving the ERM haptic device at an amplitude and/or frequency of the haptic information at 1298.

Figure 13:
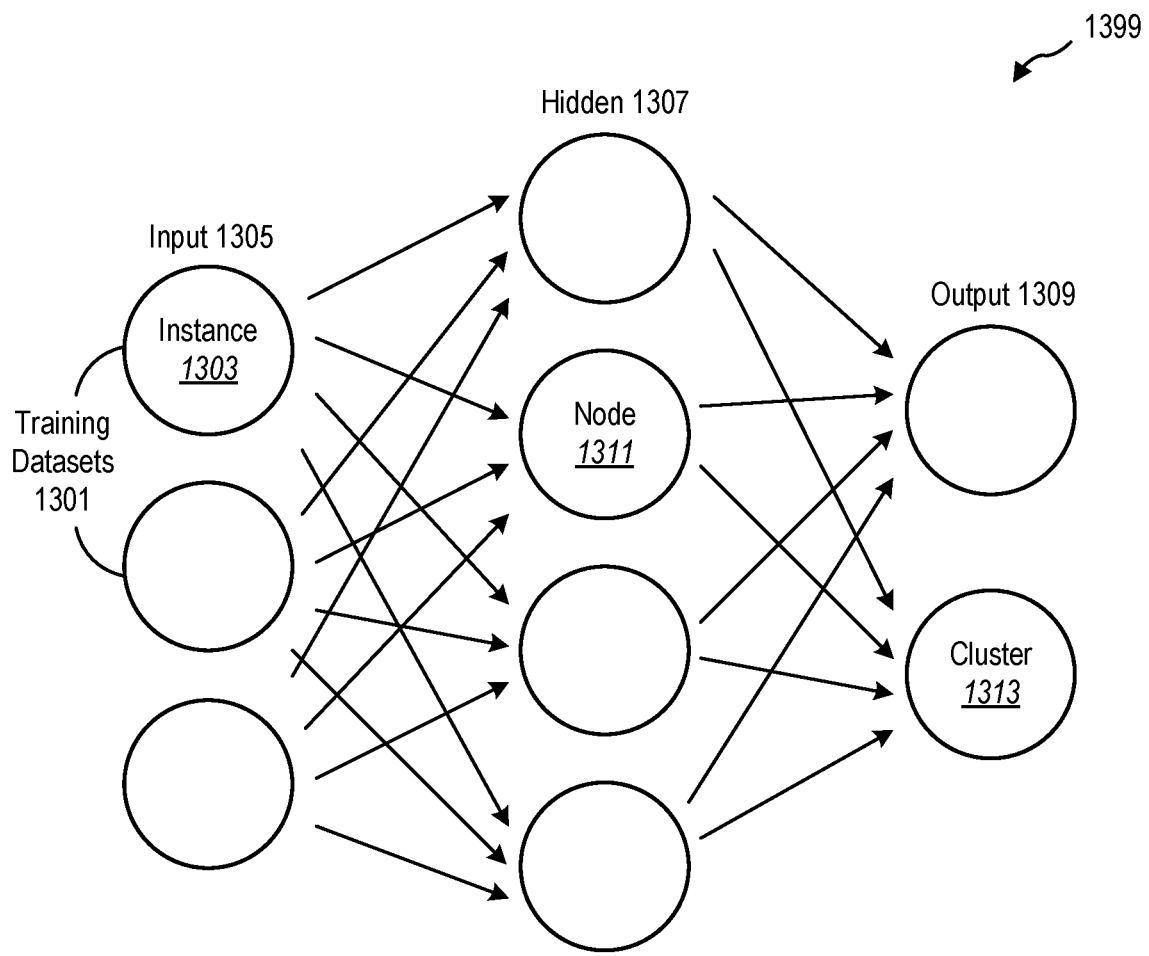
FIG. 13 is a schematic diagram of a machine learning system, according to at least some embodiments of the present disclosure.

FIG. 13 is a flowchart of an embodiment of an ML model 1399 that may be used with any of the methods described herein. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as haptic information duration, haptic information frequency, haptic information response time, haptic information amplitude, haptic device resonant frequency, haptic device response time, haptic device maximum amplitude, audio waveform, haptic device resonant waveform, haptic device power consumption, or any other value or metric related to haptic feedback with the electronic device controller.

In some embodiments, the machine learning system has a plurality of layers with an input layer 1305 configured to receive at least one input training dataset 1301 or input training instance 1303 and an output layer 1309, with a plurality of additional or hidden layers 1307 therebetween. The training datasets can be input into the machine learning system to train the machine learning system and identify individual and combinations of labels or attributes of the training instances that allow the processor or haptic controller to improve haptic feedback performance and/or reduce power consumption of the haptic feedback devices.

In some embodiments, the machine learning system can receive multiple training datasets concurrently and learn from the different training datasets simultaneously.

In some embodiments, the machine learning system includes a plurality of machine learning models that operate together. Each of the machine learning models has a plurality of hidden layers between the input layer and the output layer. The hidden layers have a plurality of input nodes (e.g., nodes 1311), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters 1313, to the output layer.

In some embodiments, each of the nodes 1311 has a linear function and an activation function. The linear function may attempt to optimize or approximate a solution with a line of best fit, such as reduced power cost or reduced latency. The activation function operates as a test to check the validity of the linear function. In some embodiments, the activation function produces a binary output that determines whether the output of the linear function is passed to the next layer of the machine learning model. In this way, the machine learning system can limit and/or prevent the propagation of poor fits to the data and/or non-convergent solutions.

The machine learning model includes an input layer that receives at least one training dataset. In some embodiments, at least one machine learning model uses supervised training. In some embodiments, at least one machine learning model uses unsupervised training. Unsupervised training can be used to draw inferences and find patterns or associations from the training dataset(s) without known outputs. In some embodiments, unsupervised learning can identify clusters of similar labels or characteristics for a variety of training instances and allow the machine learning system to extrapolate the performance of instances with similar characteristics.

In some embodiments, semi-supervised learning can combine benefits from supervised learning and unsupervised learning. As described herein, the machine learning system can identify associated labels or characteristic between instances, which may allow a training dataset with known outputs and a second training dataset including more general input information to be fused. Unsupervised training can allow the machine learning system to cluster the instances from the second training dataset without known outputs and associate the clusters with known outputs from the first training dataset.

Figure 14:
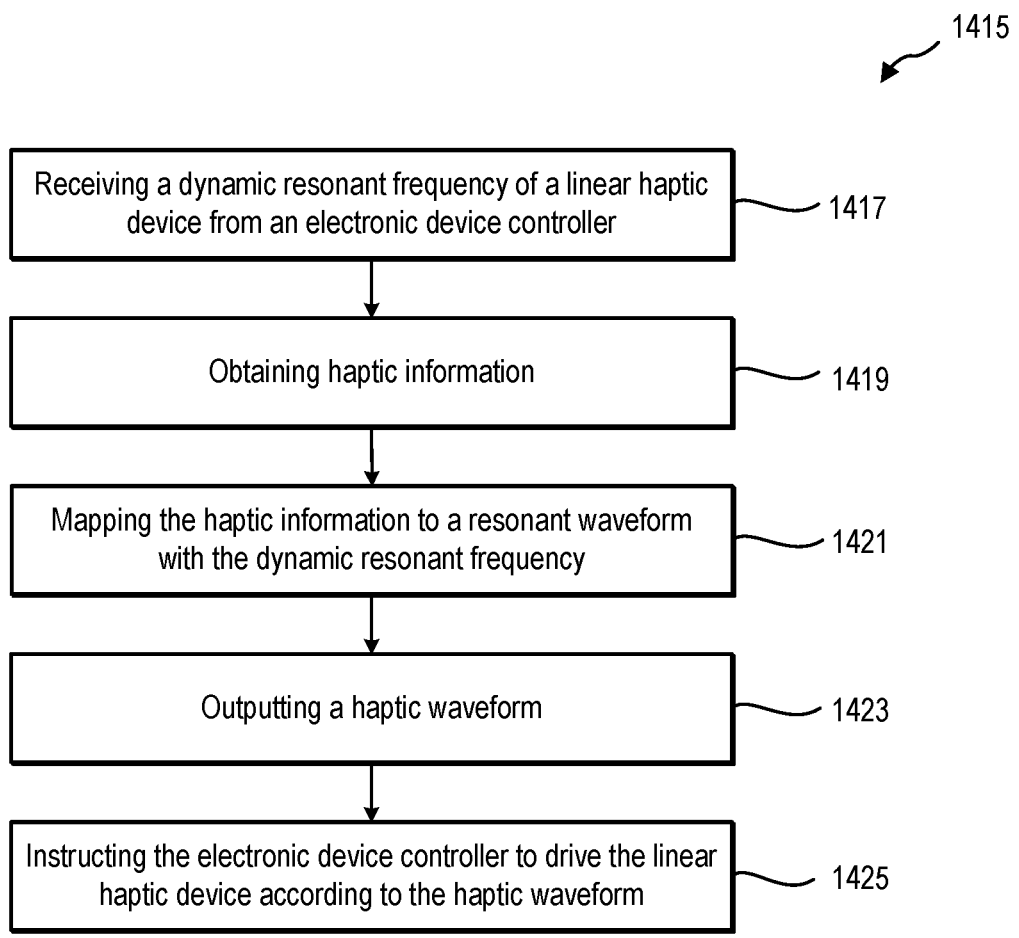
FIG. 14 is a flowchart illustrating a method of providing haptic information to an electronic device controller, according to at least some embodiments of the present disclosure.

FIG. 14 is a flowchart illustrating an embodiment of a method 1415 of providing haptic feedback to a user at an electronic device. The method includes receiving a dynamic resonant frequency of a linear haptic device at 1417 of an electronic device controller and obtaining haptic information at 1419. The method 1415 further includes mapping the haptic information to the dynamic resonant frequency at 1421 and outputting a haptic waveform at 1423. The method includes the electronic device instructing the electronic device controller to drive the haptic device according to the haptic waveform at 1425.

INDUSTRIAL APPLICABILITY

The present disclosure relates generally to systems and methods for providing haptic feedback to a user with a haptic device. More particularly, the haptic devices described herein are configured to provide haptic feedback to a user based on haptic information from a computing device or a specialized video game console. In some embodiments, a haptic device according to the present disclosure is part of an electronic device controller that may be in data communication with an electronic device, such as a personal computer or video game console. In some embodiments, an electronic device controller is in data communication via a wired data connection. In other embodiments, the electronic device controller is in wireless data communication.

In some embodiments, a haptic device according to the present disclosure is a linear haptic device. For example, a linear haptic device is any haptic device configured to accelerate a mass in a linear motion. The linear haptic device may oscillate the mass within a housing to create a shaking sensation. The linear haptic device may accelerate the mass once to create a click sensation. In some examples, a linear haptic device includes any of a linear resonant actuator (LRA), voice coil actuator (VCA), piezo electric actuators (PEA), and other electromagnetic actuators or motor that accelerate a mass with a linear acceleration. The duration, amplitude, and frequency of the waveform produced by the acceleration and/or oscillation of the mass in the haptic device can simulate or suggest a variety of haptic feedbacks to a user.

In some embodiments, the haptic device is used to simulate a haptic event, such as an in-software event, experience, action, or object. For example, the electronic device controller may be a user input device to a computing device or electronic gaming console. The computing device or electronic gaming console may have an interactive software application stored thereon that, when executed by the computing device or electronic gaming console, simulates a virtual environment with which the user can interact. When an avatar or other user-proxy interacts with the virtual environment, haptic feedback through the electronic device controller may convey that haptic event to the user. While the present disclosure will primarily reference virtual environments, in other examples, the electronic device controller may be a user input device to a machine or other device that moves and interacts with the physical environment. The electronic device controller may control or operate at least a portion of the machine, and when the machine interacts with the physical environment, haptic feedback through the electronic device controller may convey that haptic event to the user.

In a particular example, the electronic device controller may allow the user to operate a power drill (either virtual or physical). In some embodiments, the haptic device may simulate the haptic event of the vibrations of drilling into a plank of wood by recreating the haptic event via haptic devices at the same frequency, the same duration, the same amplitude, or combinations thereof. However, in some embodiments, the haptic event can be suggested to the user by haptic feedback that is close enough to the properties of the haptic event that the user perceives the haptic feedback as corresponding to the haptic event. For example, drill may vibrate at a frequency of 100 Hertz (Hz) in the virtual environment, and the haptic device may recreate that haptic event with haptic feedback of 100 Hz at the haptic device. In other examples, the haptic device may provide haptic feedback of 80 Hz. The frequency may be close enough to the haptic event that the user, while hearing the drill and seeing a visualization of the drill on a display device, perceives the haptic feedback through the electronic device as correlating to the haptic event.

Because the haptic feedback needs only to be close enough to the haptic event, in combination with the audio and video information provided to the user, haptic devices according to the present disclosure may be efficiently driven at a resonant frequency to conserve power while still providing acceptable haptic feedback. In some embodiments, a perceived frequency can be lower than the resonant frequency by varying the amplitude of the haptic device according to an envelope of a requested haptic events.

For example, a resonant frequency of a haptic device may be approximately 200 Hz, while a haptic event may have a frequency of 30 Hz. By driving the haptic device at the resonant frequency (200 Hz) and varying the amplitude of the haptic device with peak amplitudes at 30 Hz, the haptic device can operate at the efficient resonant frequency while approximating a 30 Hz haptic event.

In some embodiments, an electronic device controller includes a plurality of input buttons located on or in a body of the electronic device controller with at least one directional input device. The directional input devices may include one or more analog thumbsticks and/or one or more directional control pads. The input buttons may include face buttons, one or more menu or system buttons, shoulder buttons, trigger buttons, rear paddles, etc.

The thumbsticks and/or directional control pads may be used to control the movement of an avatar or cursor in a two- or three-dimensional virtual environment. The input buttons may be used to provide action commands (e.g., jump, crouch, defend, attack) to an avatar and/or interact with the environment. For example, a face button may be used to provide a jump command to an avatar in an adventure game application, while an analog trigger button may allow a user to precisely modulate a brake input for a racing game application.

The electronic device controller may include one of more haptic devices located in the body. In some embodiments, the haptic device imparts haptic feedback to the surface of the body, such as on a grip of the body, through which the user's palm may experience the haptic feedback. In some embodiments, haptic device imparts haptic feedback to a directional input device, such as a thumbstick, or to an input button, such as a trigger button. In at least one embodiment, a haptic device in or in communication with the trigger button may convey haptic events, such as changes in road surface during braking in the prior example. An electronic device controller may include a plurality of haptic devices in different locations, orientations, and configurations to provide a variety of haptic feedback to the user.

In some embodiments, an electronic device controller includes front grip regions, a main body region, shoulder regions, trigger regions, rear grip regions, other haptic regions, or combinations thereof. In some embodiments, an electronic device controller includes haptic devices in or in communication with directional input devices and/or input buttons, as described herein.

The haptic regions of the electronic device controller may provide haptic feedback to different regions of the user's hands and simulate or suggest different types of haptic events. For example, haptic feedback in the front grip regions may alternate between a left front grip region and a right front grip region to simulate or suggest footsteps in a virtual environment. Longer duration haptic feedback on the front grip regions may indicate footsteps from a larger entity or avatar, such as an elephant, in the virtual environment. In some examples, haptic feedback in the shoulder regions (located on the top edge of the body) may simulate or suggest rain falling on the user's avatar. In some examples, haptic feedback in the main body region may indicate a generalized or global haptic event, such as an explosion or earthquake in the virtual environment.

In some embodiments, different haptic devices are located in different haptic regions of the electronic device controller, such as different resonant frequencies, different amplitudes, different orientations, or different configurations between the haptic regions. As described herein, a linear haptic device may accelerate and/or oscillate a mass in a linear motion, and each linear haptic device may have a different resonant frequency.

In some embodiments, the linear haptic device moves a mass to generate impulses that provide the haptic feedback. In some embodiments, an electromagnet generates a magnetic field in a bore of the linear haptic device. The mass experiences a magnetic force in response to the presence of the magnetic field accelerating the mass in a first direction in the bore.

The electromagnet may then change a direction of the magnetic field and apply a magnetic force in the opposite direction. In some embodiments, the mass slows and stops proximate a first end of the device due to a restoring force. In some embodiments, a magnetic biasing element, such as a permanent magnet, applies the restoring force. In some embodiments, a mechanical biasing element, such as a spring or a bushing, applies the restoring force. After stopping proximate the first end, the mass, in some embodiments, accelerates away from the first end toward a center of the bore.

The mass moves through the bore toward a second end of the bore. By oscillating through the bore, the mass shakes the linear haptic device to create haptic feedback in response to an applied electric current. The magnetic field generated by the electromagnet may determine the speed, frequency, and amplitude of the oscillations through the linear haptic device.

In some embodiments, a linear haptic device has an inherent resonant frequency of the mass in the linear haptic device based upon the properties of the mass, magnet(s), materials, other components, manufacturing tolerances, etc. In some embodiments, manufacturing tolerances cause up to a 20% variation (±10%) in the natural resonant frequency of similarly specified linear haptic devices. A single linear haptic device may exhibit variations in the natural resonant frequency based at least partially on age or wear of the linear haptic device, temperature of the linear haptic device, orientation of the linear haptic device, etc. In some embodiments, systems and methods according to the present disclosure calculate or measure the dynamic resonant frequency of the haptic device to adapt the drive frequency of the magnetic field to the dynamic resonant frequency.

A linear haptic device, such as an LRA or VCA, has a natural resonant frequency at which the harmonics of the linear haptic device allow the linear haptic device to continue oscillating with the least input energy. For example, an impulse that is timed at the natural resonant frequency of the mass through the bore of the linear haptic device accelerates the mass through bore with the energy loss. Like a pendulum motion, the mass experiences a restoring force that urges the mass back toward the center of the bore. The impulse applied to the mass can maintain or change the amplitude of the oscillation of the mass.

In some embodiments, the waveform is output by a haptics controller to the linear haptic device as a series of electrical signals to control the electromagnet of the linear haptic device. The waveform is generated at the linear haptic device by providing input energy to a mass via the magnetic field generated in response to the electrical signals. By applying a magnetic force to the mass at the resonant frequency in alternating directions as the mass oscillates, the mass is moved with the least input energy and least power consumption. More specifically, some embodiments apply the magnetic force while the mass is near the center of the bore and while the net restoring force (i.e., that applied near either end of the bore) is approximately zero. As the restoring force may be a permanent magnet or a mechanical biasing element, the restoring force of the linear haptic device requires little or no input energy. To cause the mass to oscillate at a frequency other than the resonant frequency, additional input energy is needed to overcome or add to the restoring force.

As described herein, because the resonant frequency of the linear haptic device may be different from the specified resonant frequency for the device and/or can change with age, environment conditions, temperature, orientation, etc., a dynamic resonant frequency is calculated by the electronic device controller or the electronic device to adjust an input frequency to create the waveform. A constant waveform may have a constant frequency and a constant amplitude. The electromagnetic (EM) impulses balance drag or damping in the linear haptic device to keep the mass oscillating at the same amplitude. In some embodiments, the EM impulses are greater than or less than the drag or damping in the linear haptic device, and the amplitude changes. However, the frequency remains the same given the same restoring force(s) of the linear haptic device. Therefore, amplitude can be modulated through changes in the current to the electromagnet, while the linear haptic device continues to oscillate at the resonant frequency.

In some embodiments, an electronic device or software application running thereon sends haptic information to the electronic device controller to provide haptic feedback via one or more linear haptic devices of the electronic device controller. In some embodiments, a processor and/or haptic controller of the electronic device controller receive the haptic information.

The processor and/or haptic controller of the electronic device then maps the haptic information (e.g., the requested waveform) onto a resonant waveform of the linear haptic device to create an output waveform. In some embodiments, the haptic information is mapped to the resonant waveform as an amplitude envelope to the resonant waveform. For example, the processor and/or haptic controller instructs the linear haptic device to oscillate at the resonant frequency but change amplitude so that the perceived haptic feedback sensed by the user varies according to the haptic information.

In some embodiments, the EM impulses change while the restoring force of the linear haptic device remains the same. In such an example, the frequency of the oscillations does not change, while the amplitude varies. While the wavelength of the resonant frequency is not the same as the wavelength of the haptic information and requested waveform, the user of the electronic device controller perceives the haptic feedback in context of the audio and video information also provided by the electronic device. Therefore, the user perceives the haptic feedback as having the amplitude envelope, even when the linear haptic device operates at the resonant frequency.

In some embodiments, an electronic device controller includes at least one linear haptic device and a haptic controller in communication with the linear haptic device. In some examples, a haptic controller is in electrical communication with a plurality of linear haptic devices. In some examples, each linear haptic device has a dedicated haptic controller. In some examples, at least one linear haptic device of the electronic device controller has a dedicated haptic controller and at least two other linear haptic devices share a haptic controller. In some embodiments, the haptic controller is configured to measure and/or determine a dynamic resonant frequency of a linear haptic device at preset time intervals or on-command.

In some embodiments, the electronic device controller includes a processor in communication with the haptic controller(s). In some examples, the processor is a general-use processor. In some examples, the processor is a system on chip or application specific integrated circuit. In some examples, a haptic controller is integrated with the processor (such as in a system on chip or application specific integrated circuit).

The processor is further in communication with a hardware storage device having instructions stored thereon that, when executed by the processor, cause the electronic device controller to perform at least part of any method described herein. In some embodiments, the hardware storage device is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

In some embodiments, the processor is further in communication with a communication device. In some examples, the communication device is a wired communication device that allows communication between the electronic device controller and an electronic device via a wired connection. In some examples, the communication device is a wireless communication device that allows communication between the electronic device controller and an electronic device via a wireless connection. In some embodiments, the communication device communicates directly with the electronic device, such as via a local radio frequency (RF) communication with an antenna of the electronic device. In some embodiments, the communication device communicates indirectly with the electronic device, such as via a local RF communication with an access point to a network to communication with an electronic device, such as for cloud processing.

As described herein, the hardware storage device of the electronic device controller has instructions stored thereon that cause the electronic device controller to produce haptic feedback for a user according to haptic information received by the electronic device controller. In some embodiments, a method includes determining a dynamic resonant frequency of a haptic device. Determining a dynamic resonant frequency may include measuring the dynamic resonant frequency during operation of the linear haptic device. In some examples, determining a dynamic resonant frequency may include measuring the dynamic resonant frequency upon startup of the electronic device controller. In some examples, determining a dynamic resonant frequency may include measuring the dynamic resonant frequency in response to receiving haptic information at the electronic device controller. In some examples, determining a dynamic resonant frequency may include measuring the dynamic resonant frequency at predetermined time intervals.

The method further includes receiving haptic information at an electronic device controller and mapping the haptic information to the dynamic resonant frequency. For example, mapping the haptic information to the dynamic resonant frequency may include mapping an amplitude envelope to a resonant waveform. Mapping the haptic information to the dynamic resonant frequency may be performed at the haptic controller. Mapping the haptic information to the dynamic resonant frequency may be performed at a processor. After mapping the haptic information to the dynamic resonant frequency, the method includes outputting a haptic waveform and driving the haptic device according to the haptic waveform. In some examples, the haptic waveform may be calculated by the haptic controller and driving the haptic device may include transmitting electrical signals from the haptic controller to the linear haptic device according to the haptic waveform. In some examples, the haptic waveform may be calculated by the processor, and the processor outputs the haptic waveform to the haptic controller. The haptic controller may then drive the haptic device by transmitting electrical signals from the haptic controller to the linear haptic device according to the haptic waveform.

In some embodiments, the haptic information received from the electronic device is at least partially based on an application programming interface (API) provided to the software running on the electronic device. For example, the haptic information may have a waveform that changes based on a time step set by the API. In some embodiments, the time step is based at least partially on the dynamic resonant frequency. For example, the electronic device controller may determine the dynamic resonant frequency of a linear haptic device and map the haptic information to the resonant waveform based on a time step equal to the dynamic resonant frequency. In some examples, the electronic device controller may determine the dynamic resonant frequency of a linear haptic device and transmit the dynamic resonant frequency and/or the time step to the electronic device. The haptic information transmitted to the electronic device controller may then be based at least partially on the dynamic resonant frequency and/or the time step. In some embodiments, mapping the haptic information includes downsampling a high sample-rate waveform of the haptic information based at least partially on the time step and/or the dynamic resonant frequency.

In some embodiments, a system for providing haptic feedback to a user includes an electronic device controller containing at least one linear haptic device and an electronic device in data communication with the electronic device controller. In some embodiments, the electronic device is a general-purpose computer. In some embodiments, the electronic device is a specialized computing device, such as a retail commodity video game console. In some embodiments, the electronic device is a server computer or part of a server blade that is located remotely to the electronic device controller. In such examples, the electronic device controller is in data communication with the electronic device via a network connection.

In at least one embodiment, the electronic device and the electronic device controller transmit and receive a variety of information therebetween. For example, the electronic device may transmit to the electronic device controller information including one or more of software audio, chat audio, game input protocol (GIP) commands, and other information, such as wake commands or other control information to manage data connection with the electronic device controller. In some embodiments, the haptic information is transmitted with or in a GIP command to the electronic device controller. In some embodiments, the haptic information is determined from software audio transmitted to the electronic device controller. In some embodiments, the haptic information is determined from software audio and subsequently transmitted to the electronic device controller with or in a GIP command. For example, older software, such as legacy or backward compatible electronic games, may lack explicit haptic information, and support for haptic feedback to the user can be provided by mapping audio waveforms from the software audio to the resonant waveform.

In some embodiments, a method of providing haptic feedback to a user based on an audio input includes determining a dynamic resonant frequency of a haptic device. Determining a dynamic resonant frequency may include measuring the dynamic resonant frequency during operation of the linear haptic device. In some examples, determining a dynamic resonant frequency may include measuring the dynamic resonant frequency upon startup of the electronic device controller. In some examples, determining a dynamic resonant frequency may include measuring the dynamic resonant frequency in response to receiving haptic information at the electronic device controller. In some examples, determining a dynamic resonant frequency may include measuring the dynamic resonant frequency at predetermined time intervals.

The method further includes receiving software audio information at an electronic device controller. In some embodiments, the software audio information has an audio waveform. For example, the audio waveform may have an amplitude and a frequency and/or wavelength. The audio waveform may be mapped to the dynamic resonant frequency. In some embodiments, the amplitude of the audio waveform is scaled relative to an amplitude of the haptic device. For example, a maximum amplitude of the audio waveform may be scaled to be equal to a maximum amplitude of the haptic device. In some examples, the maximum amplitude of the audio waveform may be scaled to be equal to less than a maximum amplitude of the haptic device, such as 90%, 80%, or 50% of the maximum amplitude of the haptic device to limit wear on the haptic device. In some embodiments, the amplitude of the audio waveform may be scaled linearly to an amplitude of the haptic device. For example, an amplitude of the audio waveform that is 50% of the maximum amplitude of the audio waveform may be scaled to be 50% of the maximum amplitude of the haptic device. In some embodiments, the amplitude of the audio waveform may be scaled non-linearly to an amplitude of the haptic device. For example, an amplitude of the audio waveform that is 80% of the maximum amplitude of the audio waveform may be scaled to be 50% of the maximum amplitude of the haptic device to provide greater contrast in the haptic feedback based on the audio waveform.

In some embodiments, the method optionally includes correlating legacy (e.g., non-linear) haptic instructions with the software audio information. In some embodiments, software audio information can translate incorrectly to haptic events, such as low-frequency character dialog or certain frequencies of the software music or ambient audio. To limit unwanted audio-to-haptic conversions, the method may limit the translation of software audio information to haptic information for the haptic device(s) based at least partially on the presence of legacy haptic instructions provided by the software.

For example, the software may provide (such as in a GIP command) legacy haptic instructions to operate a non-linear haptic device, such as an eccentric rotating mass (ERM) haptic device. The duration and timing of the legacy haptic instructions may be correlated to the software audio to instruct the processor of the electronic device controller to perform audio-to-haptic translation during the timing and duration of the legacy haptic instructions. In a particular example, a legacy haptic instruction provided to the electronic device controller informs the electronic device controller to provide a haptic feedback during a cutscene in a video game. The legacy haptic instruction instructs the controller to provide haptic feedback during an explosion at the start of the cutscene and during a building collapse at the end of the cutscene. Between the two haptic events (the explosion and the building collapse), the soundtrack increases in volume and the characters speak loudly to one another.

In some embodiments, the method correlates the software audio information to the timing and duration of the legacy haptic instructions to provide haptic feedback using a linear haptic device(s) and/or a legacy haptic device during the timing and duration of the legacy haptic instructions based at least partially on the software audio information while ignoring the software audio information during other periods. In doing so, the method may allow the electronic device controller to provide improved haptic feedback to the user when a developer intended, and the method limits false positives for the creation of new haptic events unintended by the developer.

Similar to as described herein, mapping the haptic information to the dynamic resonant frequency may include mapping an amplitude envelope to a resonant waveform. Mapping the haptic information to the dynamic resonant frequency may be performed at the haptic controller. Mapping the haptic information to the dynamic resonant frequency may be performed at a processor. After mapping the haptic information to the dynamic resonant frequency, the method includes outputting a haptic waveform and driving the haptic device according to the haptic waveform. In some examples, the haptic waveform may be calculated by the haptic controller and driving the haptic device may include transmitting electrical signals from the haptic controller to the linear haptic device according to the haptic waveform. In some examples, the haptic waveform may be calculated by the processor, and the processor outputs the haptic waveform to the haptic controller. The haptic controller may then drive the haptic device by transmitting electrical signals from the haptic controller to the linear haptic device according to the haptic waveform.

In some embodiments, an ERM haptic device provides low frequency, slow response haptics. The ERM haptic device includes a motor configured to rotate a driveshaft. The driveshaft is rotationally fixed to a mass. The rotating mass is off-center from the rotational axis of the driveshaft.

ERM haptic devices produce an uneven centripetal force which causes the ERM haptic device to move backwards and forwards. This movement also produces a side-to-side vibration, i.e., lateral vibrations. ERM haptic devices typically contain a larger mass than a linear haptic device, which allows for more powerful haptic feedback, but with lower frequency and with slower response times. In contrast, linear haptic devices can allow for rapid changes to amplitude that can modulate the haptic feedback and/or start and stop the haptic feedback faster than an ERM. In some embodiments, an ERM haptic device can be used in conjunction with a linear haptic device to provide a combination of powerful and advanced haptic feedback.

In some embodiments, an electronic device controller includes at least one linear haptic device, at least one ERM haptic device, and a haptic controller. In some examples, a haptic controller is in electrical communication with a plurality of haptic devices. In some examples, each haptic device has a dedicated haptic controller. In some examples, at least one haptic device of the electronic device controller has a dedicated haptic controller and at least two other haptic devices share a haptic controller. In some embodiments, the haptic controller is configured to measure and/or determine a dynamic resonant frequency of a linear haptic device at preset time intervals or on-command.

In some embodiments, the electronic device controller includes a processor in communication with the haptic controller(s). In some examples, the processor is a general-use processor. In some examples, the processor is a system on chip or application specific integrated circuit. In some examples, a haptic controller is integrated with the processor (such as in a system on chip or application specific integrated circuit).

The processor is further in communication with a hardware storage device having instructions stored thereon that, when executed by the processor, cause the electronic device controller to perform at least part of any method described herein. In some embodiments, the hardware storage device is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

In some embodiments, the processor is further in communication with a communication device. In some examples, the communication device is a wired communication device that allows communication between the electronic device controller and an electronic device via a wired connection. In some examples, the communication device is a wireless communication device that allows communication between the electronic device controller and an electronic device via a wireless connection. In some embodiments, the communication device communicates directly with the electronic device, such as via a local RF communication with an antenna of the electronic device. In some embodiments, the communication device communicates indirectly with the electronic device, such as via a local RF communication with an access point to a network to communication with an electronic device, such as for cloud processing.

In some embodiments, a combination of at least one linear haptic device for high frequency and/or fast response haptic feedback and at least one ERM haptic device for low-frequency and/or slow response haptic feedback can allow an electronic device controller according to the present disclosure to provide powerful and advanced haptic feedback while consuming less electrical power.

In some embodiments, the processor and/or haptic controller selects one or both of the linear haptic device and the ERM haptic device to produce the haptic feedback based on the haptic information. In some embodiments, a method of providing haptic feedback to a user using a hybrid haptic array includes receiving haptic information (or determining haptic information from software audio information). The method further includes selecting a haptic device from a linear haptic device and an ERM haptic device.

In some embodiments, selecting the haptic device includes comparing a duration of the haptic information to a threshold duration. For example, a haptic information that is longer than a threshold duration may result in the selection of the ERM haptic device to conserve power in the electronic device controller. Because the moving mass of the ERM haptic device is conventionally greater than that of a linear haptic device, short duration haptic events may consume more power to start and stop the moving mass of the ERM haptic device than that of the linear haptic device. Similarly, the ERM haptic device may consume less power once moving relative to the linear haptic device.

In some embodiments, the selecting the haptic device includes comparing a duration of the haptic information to a threshold response time. For example, a haptic information that is shorter than a threshold response time may result in the selection of the linear haptic device in the electronic device controller. Because the moving mass of the ERM haptic device is conventionally greater than that of a linear haptic device, starting and stopping the rotating mass to recreate short duration haptic events may not be possible or not possible at a desired precision. Similarly, the linear haptic device may accelerate and decelerate the oscillating mass more quickly than the ERM haptic device, allowing haptic feedback with greater fidelity in response to short duration haptic information and/or events.

In some embodiments, selecting the haptic device includes comparing a frequency of the haptic information to a threshold frequency. For example, a haptic information with a frequency less than a threshold frequency may result in the selection of the ERM haptic device more powerfully replicate the low-frequency vibration. Because the frequency of the ERM haptic device is conventionally lower than that of a linear haptic device, low-frequency haptic events may be more readily reproduced by the rotating mass of the ERM haptic device than the smaller and faster oscillation of the linear haptic device. Similarly, the ERM haptic device may provide a more powerful vibration in the haptic feedback due to a larger mass than the linear haptic device. In some embodiments, the low-frequency haptic event is an explosion or other powerful haptic event that may benefit from a larger low-frequency vibration.

In some embodiments, selecting the haptic device includes selecting both of the linear haptic device and the ERM haptic device. For example, haptic information with an amplitude greater than a threshold amplitude may result in the electronic device controller operating both the ERM haptic device and the linear haptic device. In some examples, the linear haptic device may provide a short response time and the ERM haptic device may provide a long duration and powerful vibration. In some embodiments, selecting the haptic device or combination of haptic devices may be at least partially performed by a machine learning model (ML) model or system.

After selecting a linear haptic device, the method further includes determining a dynamic resonant frequency and mapping the haptic information to the dynamic resonant frequency. For example, mapping the haptic information to the dynamic resonant frequency may include mapping an amplitude envelope to a resonant waveform. Mapping the haptic information to the dynamic resonant frequency may be performed at the haptic controller. Mapping the haptic information to the dynamic resonant frequency may be performed at a processor. After mapping the haptic information to the dynamic resonant frequency, the method includes outputting a haptic waveform and driving the haptic device according to the haptic waveform. In some examples, the haptic waveform may be calculated by the haptic controller and driving the haptic device may include transmitting electrical signals from the haptic controller to the linear haptic device according to the haptic waveform. In some examples, the haptic waveform may be calculated by the processor, and the processor outputs the haptic waveform to the haptic controller. The haptic controller may then drive the haptic device by transmitting electrical signals from the haptic controller to the linear haptic device according to the haptic waveform.

In some embodiments, the haptic information received from the electronic device is at least partially based on an API provided to the software running on the electronic device. For example, the haptic information may have a waveform that changes based on a time step set by the API. In some embodiments, the time step is based at least partially on the dynamic resonant frequency. For example, the electronic device controller may determine the dynamic resonant frequency of a linear haptic device and map the haptic information to the resonant waveform based on a time step equal to the dynamic resonant frequency. In some examples, the electronic device controller may determine the dynamic resonant frequency of a linear haptic device and transmit the dynamic resonant frequency and/or the time step to the electronic device. The haptic information transmitted to the electronic device controller may then be based at least partially on the dynamic resonant frequency and/or the time step. In some embodiments, mapping the haptic information includes downsampling a high sample-rate waveform of the haptic information based at least partially on the time step and/or the dynamic resonant frequency.

As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as haptic information duration, haptic information frequency, haptic information response time, haptic information amplitude, haptic device resonant frequency, haptic device response time, haptic device maximum amplitude, audio waveform, haptic device resonant waveform, haptic device power consumption, or any other value or metric related to haptic feedback with the electronic device controller.

In some embodiments, the machine learning system has a plurality of layers with an input layer configured to receive at least one input training dataset or input training instance and an output layer, with a plurality of additional or hidden layers therebetween. The training datasets can be input into the machine learning system to train the machine learning system and identify individual and combinations of labels or attributes of the training instances that allow the processor or haptic controller to improve haptic feedback performance and/or reduce power consumption of the haptic feedback devices.

In some embodiments, the machine learning system can receive multiple training datasets concurrently and learn from the different training datasets simultaneously.

In some embodiments, the machine learning system includes a plurality of machine learning models that operate together. Each of the machine learning models has a plurality of hidden layers between the input layer and the output layer. The hidden layers have a plurality of input nodes, where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters, to the output layer.

In some embodiments, each of the nodes has a linear function and an activation function. The linear function may attempt to optimize or approximate a solution with a line of best fit, such as reduced power cost or reduced latency. The activation function operates as a test to check the validity of the linear function. In some embodiments, the activation function produces a binary output that determines whether the output of the linear function is passed to the next layer of the machine learning model. In this way, the machine learning system can limit and/or prevent the propagation of poor fits to the data and/or non-convergent solutions.

The machine learning model includes an input layer that receives at least one training dataset. In some embodiments, at least one machine learning model uses supervised training. In some embodiments, at least one machine learning model uses unsupervised training. Unsupervised training can be used to draw inferences and find patterns or associations from the training dataset(s) without known outputs. In some embodiments, unsupervised learning can identify clusters of similar labels or characteristics for a variety of training instances and allow the machine learning system to extrapolate the performance of instances with similar characteristics.

In some embodiments, semi-supervised learning can combine benefits from supervised learning and unsupervised learning. As described herein, the machine learning system can identify associated labels or characteristic between instances, which may allow a training dataset with known outputs and a second training dataset including more general input information to be fused. Unsupervised training can allow the machine learning system to cluster the instances from the second training dataset without known outputs and associate the clusters with known outputs from the first training dataset.

In some embodiments, an electronic device provides haptic information to a linear haptic device and/or an electronic device controller containing a linear haptic device based on a dynamic resonant frequency of the linear haptic device. In some embodiments, a method of providing haptic feedback to a user includes, at an electronic device, obtaining haptic information and receiving a dynamic resonant frequency of a haptic device of an electronic device controller. The method further includes mapping the haptic information to the dynamic resonant frequency and outputting a haptic waveform. The method includes the electronic device instructing the electronic device controller to drive the haptic device according to the haptic waveform.

The present disclosure relates to systems and methods for providing haptic feedback to a user according to at least the examples provided in the sections below:

[A1] In some embodiments, a method of providing haptic feedback to a user includes, at an electronic device controller, determining a dynamic resonant frequency of a haptic device; receiving haptic information at an electronic device controller; mapping the haptic information to a resonant waveform with the dynamic resonant frequency; outputting a haptic waveform; and driving the haptic device according to the haptic waveform.

[A2] In some embodiments, mapping the haptic information of [A1] includes altering an amplitude of the resonant waveform based on the haptic information.

[A3] In some embodiments, mapping the haptic information of [A1] includes setting a time step for amplitude changes based on the dynamic resonant frequency.

[A4] In some embodiments, mapping the haptic information of [A3] includes downsampling a high sample-rate haptic waveform based at least partially on the time step.

[A5] In some embodiments, the haptic information of any of [A1] through [A4] is received in a game input protocol command.

[A6] In some embodiments, the haptic information of any of [A1] through [A4] is determined from audio information received at the electronic device controller.

[A7] In some embodiments, the method of any of [A1] through [A6] further includes transmitting the dynamic resonant frequency to an electronic device and wherein the haptic information is received from the electronic device.

[A8] In some embodiments, the dynamic resonant frequency of any of [A1] through [A7] is determined upon startup of the electronic device controller.

[A9] In some embodiments, the dynamic resonant frequency of any of [A1] through [A7] is determined at preset time intervals.

[A10] In some embodiments, the dynamic resonant frequency of any of [A1] through [A7] is determined upon receiving haptic information.

[A11] In some embodiments, a drive frequency of the haptic waveform of any of [A1] through [A10] is different from a requested frequency of the haptic information.

[B1] In some embodiments, an electronic device controller includes a body, at least one input button, a processor, a communication device in communication with the processor, a haptics controller in communication with the processor, a linear haptic device in communication with the haptics controller, and a hardware storage device in communication with the processor or the haptics controller. The hardware storage device has instructions stored thereon that, when executed by the processor or haptics controller, cause the electronic device controller to determine a dynamic resonant frequency of the linear haptic device, receive haptic information, map the haptic information to the dynamic resonant frequency, output a haptic waveform, and drive the haptic device according to the haptic waveform.

[B2] In some embodiments, the electronic device controller of [B1] further includes an ERM haptic device, and wherein the instructions further cause the electronic device to select at least one of the linear haptic device and the ERM haptic device based at least partially on the haptic information and drive a selected haptic device.

[B3] In some embodiments, the selected haptic device of [B2] is selected at least partially based on a duration of the haptic information.

[B4] In some embodiments, the selected haptic device of [B2] is selected at least partially based on a frequency of the haptic information.

[B5] In some embodiments, the selected haptic device of [B2] is selected at least partially based on conserving power during haptic feedback.

[B6] In some embodiments, receiving the haptic information of any of [B1] through [B5] includes receiving software audio information and calculating the haptic information from the software audio information.

[B7] In some embodiments, the haptic information of [B6] is linear haptic information and calculating the linear haptic information is based at least partially on legacy haptic information.

[C1] In some embodiments, a method of providing haptic feedback to a user includes, at an electronic device, obtaining haptic information; receiving a dynamic resonant frequency of a haptic device of an electronic device controller; mapping the haptic information to the dynamic resonant frequency; outputting a haptic waveform; and instructing the electronic device controller to drive the haptic device according to the haptic waveform.

[C2] In some embodiments, the haptic waveform of [C2] is based at least partially on a time step according to the dynamic resonant frequency.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of providing haptic feedback to a user, the method comprising:
at an electronic device controller:
determining a dynamic resonant frequency of a haptic device; receiving haptic information at the electronic device controller, the haptic information specifying a requested frequency that is relatively lower than the dynamic resonant frequency of the haptic device;
mapping the haptic information to the dynamic resonant frequency, the mapping resulting in a haptic waveform that approximates the relatively lower requested frequency by varying amplitudes of the haptic waveform over time at the relatively lower requested frequency while driving the haptic device at the dynamic resonant frequency;

outputting the haptic waveform; and driving the haptic device according to the haptic waveform, the driving causing the haptic device to resonate at the dynamic resonant frequency while changing amplitude over time based on the haptic waveform.

2. The method of claim 1, wherein mapping the haptic information includes setting a time step for amplitude changes based on the dynamic resonant frequency.

3. The method of claim 2, wherein mapping the haptic information includes downsampling a high sample-rate haptic waveform based at least partially on the time step.

4. The method of claim 1, wherein the haptic information is received in a game input protocol command.

5. The method of claim 1, wherein the haptic information is determined from audio information received at the electronic device controller.

6. The method of claim 1, further comprising transmitting the dynamic resonant frequency to an electronic device, and wherein the haptic information is received from the electronic device.

7. The method of claim 1, wherein the dynamic resonant frequency is determined upon startup of the electronic device controller.

8. The method of claim 1, wherein the dynamic resonant frequency is determined at preset time intervals.

9. The method of claim 1, wherein the dynamic resonant frequency is determined upon receiving haptic information.

10. The method of claim 1, further comprising:

determining a time step based at least on the dynamic resonant frequency of the haptic device;

providing an application programming interface to a software application; receiving the haptic information from the software application via the application programming interface; and mapping the haptic information received via the application programming interface to the dynamic resonant frequency based at least on the determined time step.

11. The method of claim 1, wherein the amplitudes are varied by generating varying electromagnetic impulses while maintaining a consistent restoring force of the haptic device.

12. An electronic device controller comprising: a body; at least one input button; a processor;

a communication device in communication with the processor; a haptics controller in communication with the processor;

a linear haptic device in communication with the haptics controller; and a hardware storage device in communication with the processor or the haptics controller having instructions stored thereon that, when executed by the processor or the haptics controller, cause the electronic device controller to:

determine a dynamic resonant frequency of the linear haptic device, receive haptic information, the haptic information specifying a requested frequency that is relatively lower than the dynamic resonant frequency of the haptic device, perform mapping of the haptic information to the dynamic resonant frequency, the mapping resulting in a haptic waveform that approximates the relatively lower requested frequency by varying amplitudes of the haptic waveform over time at the relatively lower requested frequency while driving the haptic device at the dynamic resonant frequency, and drive the linear haptic device according to the haptic waveform, the driving causing the haptic device to resonate at the dynamic resonant frequency while changing amplitude over time based on the haptic waveform.

13. The electronic device controller of claim 12, further comprising an eccentric rotating mass (ERM) haptic device, and wherein the instructions further cause the electronic device controller to:

select at least one of the linear haptic device or the ERM haptic device as a selected haptic device based at least partially on the haptic information, and drive the selected haptic device according to the haptic waveform.

14. The electronic device controller of claim 13, wherein the selected haptic device is selected at least partially based on a duration of the haptic information.

15. The electronic device controller of claim 13, wherein the selected haptic device is selected at least partially based on a frequency of the haptic information.

16. The electronic device controller of claim 13, wherein the selected haptic device is selected at least partially based on conserving power during haptic feedback.

17. The electronic device controller of claim 12, wherein receiving the haptic information includes:

receiving software audio information, and calculating the haptic information from the software audio information.

18. The electronic device controller of claim 17, wherein the haptic information is linear haptic information and calculating the linear haptic information is based at least partially on legacy haptic information.

19. A method of providing haptic feedback to a user, the method comprising:

at an electronic device:

receiving a dynamic resonant frequency of a haptic device of an electronic device controller;

obtaining haptic information, the haptic information specifying a requested frequency that is relatively lower than the dynamic resonant frequency of the haptic device;

mapping the haptic information to the dynamic resonant frequency, the mapping resulting in a haptic waveform that approximates the relatively lower requested frequency by varying amplitudes of the haptic waveform over time at the relatively lower requested frequency while driving the haptic device at the dynamic resonant frequency; and instructing the electronic device controller to drive the haptic device by varying amplitudes over time according to the haptic waveform.

20. The method of claim 19, wherein the haptic waveform is based at least partially on a time step according to the dynamic resonant frequency.

* * * * *